US 8,297,850 B2

(12) United States Patent
Nishioka et al.

(10) Patent No.: US 8,297,850 B2
(45) Date of Patent: Oct. 30, 2012

(54) OPTICAL CONNECTOR, AND METHOD OF ASSEMBLING OPTICAL CONNECTOR

(75) Inventors: Daizo Nishioka, Yokohama (JP);
Kenichiro Ohtsuka, Yokohama (JP);
Kazuhito Saito, Yokohama (JP);
Yoshikyo Tamekuni, Yokohama (JP);
Yukihiro Yokomachi, Yokohama (JP);
Tunetaka Ema, Musashino (JP);
Kenichi Nakazawa, Musashino (JP);
Yasuhiko Hoshino, Musashino (JP)

(73) Assignees: Sumitomo Electric Industries, Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 526 days.

(21) Appl. No.: 11/660,539

(22) PCT Filed: Aug. 19, 2005

(86) PCT No.: PCT/JP2005/015147
§ 371 (c)(1),
(2), (4) Date: Aug. 30, 2007

(87) PCT Pub. No.: WO2006/019161
PCT Pub. Date: Feb. 23, 2006

(65) Prior Publication Data
US 2008/0107381 A1      May 8, 2008

(30) Foreign Application Priority Data

Aug. 20, 2004   (JP) ................ P2004-241407
Aug. 20, 2004   (JP) ................ P2004-241446

(51) Int. Cl.
*G02B 6/38*   (2006.01)
*G02B 6/36*   (2006.01)
*G02B 6/44*   (2006.01)
*G02B 6/00*   (2006.01)

(52) U.S. Cl. ............... 385/60; 385/53; 385/78; 385/81; 385/100; 385/136

(58) Field of Classification Search ............ 385/53, 385/55, 56, 59, 60, 69, 75–78, 81, 85–87, 385/89, 95–100, 136, 139
See application file for complete search history.

(56) References Cited

U.S. PATENT DOCUMENTS
5,570,443 A * 10/1996 May et al. ............. 385/75
(Continued)

FOREIGN PATENT DOCUMENTS
JP     04-102808     4/1992
(Continued)

OTHER PUBLICATIONS

Ohtsuka, K., et al, "Development of QSC connector fixing optical fiber cable", General Conference of The Institute of Electronics, Information and Communication Engineers, 2004, Japan.
(Continued)

*Primary Examiner* — Brian M. Healy
*Assistant Examiner* — Hung Lam
(74) *Attorney, Agent, or Firm* — McDermott Will & Emery LLP

(57) ABSTRACT

An optical connector according to an embodiment of the present invention comprises (a) a ferrule incorporating a short fiber; (b) a mechanical splice having a holding part and a fixing part, and adapted so that the fixing part mechanically fixes the short fiber extending from the ferrule held by the holding part, and an optical fiber in an optical cable to butt the short fiber; (c) an outer housing having a housing part in which the mechanical splice is located, and a pair of flexible arms located on both sides of the housing part, the pair of arms each being provided with a locking claw at a tip; and (d) a jacket fixture for fixing a cable jacket, the jacket fixture being coupled to the mechanical splice so that the cable jacket is inserted therein.

13 Claims, 32 Drawing Sheets

U.S. PATENT DOCUMENTS

| | | | |
|---|---|---|---|
| 5,588,080 A | 12/1996 | Kawamura | |
| 5,909,528 A | 6/1999 | Tamekuni et al. | |
| 6,062,740 A | 5/2000 | Ohtsuka et al. | |
| 6,173,097 B1 | 1/2001 | Throckmorton et al. | |
| 6,186,672 B1 | 2/2001 | Takizawa et al. | |
| 6,783,280 B2* | 8/2004 | Viklund | 385/55 |
| 6,848,836 B2* | 2/2005 | Ueda et al. | 385/78 |
| 6,905,253 B2* | 6/2005 | Murayama et al. | 385/86 |
| 7,466,891 B2* | 12/2008 | Wagner et al. | 385/139 |
| 2002/0048435 A1* | 4/2002 | Scanzillo | 385/81 |
| 2004/0047566 A1* | 3/2004 | McDonald et al. | 385/78 |
| 2004/0072454 A1* | 4/2004 | Nakajima et al. | 439/79 |
| 2005/0244108 A1* | 11/2005 | Billman et al. | 385/60 |

FOREIGN PATENT DOCUMENTS

| | | |
|---|---|---|
| JP | 8-179163 | 7/1996 |
| JP | 11-72655 | 3/1999 |
| JP | 11-160563 | 6/1999 |
| JP | 11-218643 | 8/1999 |
| JP | 2001-51152 | 2/2001 |
| JP | 2001-311854 | 11/2001 |
| JP | 2002-40287 | 2/2002 |
| JP | 2002-107574 | 4/2002 |
| JP | 2003-177275 | 6/2003 |
| JP | 2003-322762 | 11/2003 |
| JP | 2004-138917 | 5/2004 |
| JP | 2004-151670 | 5/2004 |
| JP | 2005-265974 | 9/2005 |
| JP | 2005-265975 | 9/2005 |
| WO | WO 03/067295 A1 | 8/2003 |

OTHER PUBLICATIONS

International Preliminary Report on Patentability and Written Opinion of The international Searching Authority issued in International Application No. PCT/JP2005/015147, dated Mar. 1, 2007.

Chinese Office Action, with English translation Issued in Chinese Patent Application No. CN 2005-80019464.6 dated on Mar. 28, 2008.

European Search Report, issued in corresponding European Patent Application No. 05780448.6-1234, dated on Oct. 17, 2007.

Japanese Notice of Reasons for Rejection, w/ English translation thereof, issued in Japanese Patent Application No. JP 2006-53187 dated Aug. 11, 2009.

United States Office Action issued in U.S. Appl. No. 13/012,346 dated Jun. 27, 2011.

United States Office Action issued in U.S. Appl. No. 13/012,346 dated Mar. 16, 2012.

Korean Office Action issued in Korean Patent Application No. 10-2007-7006228 dated May 2, 2012.

* cited by examiner

Fig.12
(A)
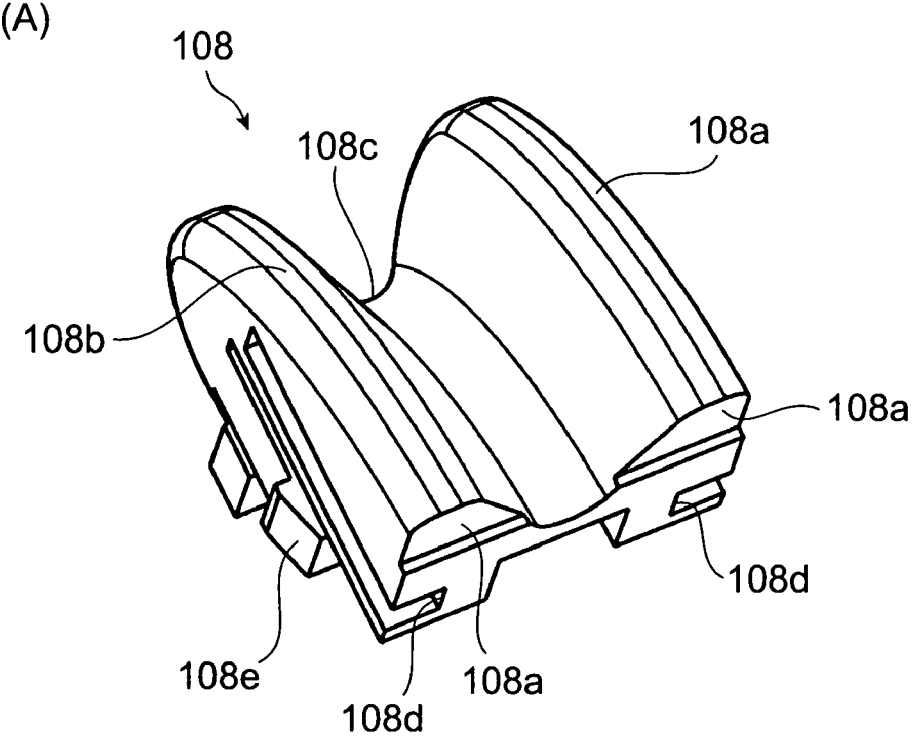
(B)
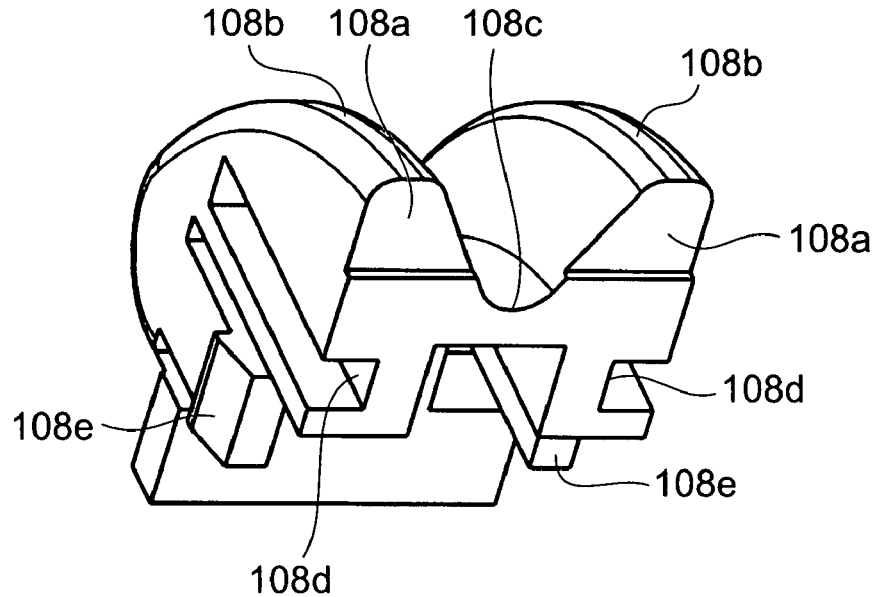

OPTICAL CONNECTOR, AND METHOD OF ASSEMBLING OPTICAL CONNECTOR

RELATED APPLICATIONS

This application is a national phase of PCT/JP2005/015147 filed on Aug. 19, 2005, which claims priority from Japanese Application No. 2004-241446 and Japanese Application No. 2004-241407 both of which were filed on Aug. 20, 2004, the disclosures of which applications are incorporated by reference herein. The benefit of the filing and priority dates of the International and Japanese Applications is respectfully requested.

TECHNICAL FIELD

The present invention relates to an optical connector to be suitably connected to an optical cable of a tight structure, and to an assembling method of the optical connector.

BACKGROUND ART

For example, an optical cable such as a drop cable or an indoor cable is a cable in which a coated optical fiber and tension members are covered by a jacket (sheath), and has a so-called tight structure in which the coated optical fiber and tension members are attached tightly to the cable jacket.

A conventional optical connector to be connected to such an optical cable of the tight structure is provided with a ferrule and a mechanical splice. In this optical connector, a wedge is forced into the mechanical splice which holds the ferrule with a short fiber therein, at a tip, whereby the mechanical splice is brought into an open state. Then a cable jacket is removed from an optical cable to expose a coated fiber, a coating of the coated optical fiber is further removed to expose the optical fiber, and the exposed optical fiber is guided into the mechanical splice in the open state from the rear end thereof. In a state in which the leading end face of this optical fiber is kept as butting the rear end face of the short fiber, the wedge is pulled out to bring the mechanical splice into a closed state, whereby the mechanical splice fixes the butting portion between the short fiber and the optical fiber. Such an optical connector is disclosed, for example, in Japanese Patent Application Laid-Open No. 11-160563.

DISCLOSURE OF THE INVENTION

In the above-described optical connector, the coated fiber is led out from the rear end face of the mechanical splice and the coated fiber can be subject to an excessive force such as a bending force from the outside during a work, which could result in causing trouble of breakage of the fiber or the like. In the foregoing optical connector, in order to protect the coated fiber, a protecting tube is attached to the coated optical fiber led out from the mechanical splice, and this protecting tube is inserted into a boot. However, works such as attachment of the boot and the protecting tube are cumbersome and take some time.

An object of the present invention is therefore to provide an optical connector capable of readily protecting a coated fiber, and an assembling method of the optical connector improved in workability during assembly of the optical connector at a job site.

An optical connector according to an aspect of the present invention is an optical connector comprising a mechanical splice which holds a ferrule with a short fiber therein, at a tip, into which an optical fiber in an optical cable of a tight structure in which a coated fiber obtained by coating the optical fiber is attached tightly to a cable jacket covering the coated fiber, is guided from the back, and which mechanically fixes a butting portion between the optical fiber and the short fiber, the optical connector comprising: an outer housing having a housing part for internally housing the mechanical splice and a pair of flexible arms coupled to the housing part, located on both sides of the housing part, projecting toward a connected partner, and each provided with a locking claw for attachment to the connected partner, on its tip side; and a jacket fixture coupled to a rear end side of the mechanical splice so that the cable jacket is inserted therein, the jacket fixture being adapted for fixing the cable jacket.

Specifically, an optical connector according to an aspect of the present invention is an optical connector to be connected to an optical fiber in an optical cable of a tight structure in which a coated fiber obtained by coating the optical fiber is attached tightly to a cable jacket covering the coated fiber, the optical connector comprising: (a) a ferrule incorporating a short fiber extending in a predetermined axial direction; (b) a mechanical splice having a holding part and a fixing part in order from a one side to an other side in the predetermined axial direction, and adapted so that the fixing part mechanically fixes the short fiber extending from the ferrule held by the holding part, toward the other side, and the optical fiber in the optical cable introduced from the other side to butt the short fiber; (c) an outer housing having a cylindrical shape extending in the predetermined axial direction, and having a housing part in which the mechanical splice is located, and a pair of flexible arms located on both sides of the housing part, the pair of arms each extending from a base end supported on the housing part, toward the one side and provided with a locking claw at a tip opposite to the base end; and (d) a jacket fixture for fixing the cable jacket, the jacket fixture being located on the other side with respect to the mechanical splice so that the cable jacket is inserted therein, and the jacket fixture being coupled to the mechanical splice.

In this optical connector, the cable jacket is inserted into the jacket fixture coupled to the rear end side of the mechanical splice, to be fixed thereby, whereby the simple configuration prevents the coated fiber exposed from the cable jacket, from being subject to an excessive force such as a bending force from the outside during a work. Namely, since the cable jacket is fixed by the jacket fixture coupled to the mechanical splice, no external force is applied to the coated fiber exposed from the cable jacket.

Since the outer housing housing the mechanical splice has the pair of flexible arms coupled to the housing part housing the mechanical splice, located on both sides of the housing part, projecting toward a connected partner, and each provided with the locking claw for attachment to the connected partner, on the tip side, the optical connector is readily attached to the connected partner, for example, by simply locking the connected partner, such as an adapter, with the locking claws. The conventional technology sometimes required storage of the coated fiber on a storage tray or the like, whereas the optical connector of the present invention eliminates the need for the storage on the storage tray or the like and thus achieves reduction of production cost and improvement in workability.

In a preferred configuration the aforementioned mechanical splice is housed in a movable state in the axial direction in the outer housing and is biased toward the tip side by a spring. Namely, in the optical connector of the present invention, preferably, the mechanical splice is arranged to be movable in the predetermined axial direction inside the housing part, and the jacket fixture is coupled to the mechanical splice so that the jacket fixture can move integrally with the mechanical splice in the predetermined axial direction. Preferably, the optical connector of the present invention further comprises a spring for biasing the mechanical splice toward the one side.

In this configuration, for example, when ferrule's back motion occurs during optical connection or the like with a connected partner, the cable jacket fixed to the jacket fixture moves backward with the ferrule's back motion, together with the jacket fixture coupled to the mechanical splice holding the ferrule. Therefore, the coated optical fiber exposed from the cable jacket is prevented from being bent, so as to securely prevent breakage of the fiber with occurrence of the ferrule's back motion. In addition, no loss is made due to bending of the coated fiber.

The optical connector of the present invention may be configured as follows: it further comprises a coupling member for coupling the mechanical splice to the jacket fixture, and having a first contact surface extending along a plane intersecting with the predetermined axis and facing the other side; and a spring push fixed to the outer housing and having a second contact surface facing the first contact surface; the spring is located between the first contact surface and the second contact surface.

Preferably, each arm comprises a rib. This rib moderately enhances the rigidity of the flexible arm. Therefore, the locking claws securely lock the connected partner, so as to prevent failure in optical connection due to occurrence of creep.

Preferably, the housing part has a projection on an outer surface thereof facing each arm. Since the arm comes into contact with this projection, the arm is prevented from excessively being bent to the inside, and is thus prevented from breaking.

Preferably, each locking claw is located on an exterior side of the arm, and the arms are preliminarily spread slightly to the outside. In this configuration, the flexible arms are bent inward once, and then open to bring the locking claws into a lock with the connected partner, whereby the locking claws are securely engaged with the connected partner, with a good click feeling upon the engagement.

Preferably, each arm comprises a projection projecting outward, on the root side, i.e., at the base end. When this configuration is adopted, the locking claws are readily engaged with the connected partner by simply pushing the projections, in a state without bending of the arms due to an external force. In the case of the configuration in which the ferrule, the mechanical splice, and the jacket fixture are coupled and in which the ferrule's back motion can occur as described above, it is difficult to attach the optical connector to the connected partner while holding the jacket fixture, and it is thus particularly effective to attach the optical connector to the connected partner while pushing the projections projecting outward on the root side of the arms.

Preferably, the jacket fixture overlaps the outer housing in the axial direction from the rear end to near the roots of the arms thereof. Namely, preferably, the jacket fixture overlaps the outer housing from an end on the other side to near the arms, in the predetermined axial direction. This configuration enhances the rigidity against an external force acting when the optical cable is bent and pulled.

Preferably, the optical connector of the present invention comprises a jacket holder for holding the cable jacket and this jacket holder is fixed together with the cable jacket to the jacket fixture by a clip. Namely, preferably, the optical connector of the present invention further comprises a jacket holder for holding the cable jacket; and a clip for fixing the jacket holder to the jacket fixture. This configuration achieves firm fixing because the jacket holder holding the cable jacket, and the cable jacket both are fixed to the jacket fixture. By adopting the configuration wherein the clip moves into and across the entire length of the jacket holder, the total length of the optical connector including the jacket fixture is reduced.

Preferably, the jacket fixture is completely covered by the outer housing or by a member coupled to the outer housing. In this configuration, the optical connector can be readily attached to the connected partner while a worker holds the outer housing or the member coupled to the outer housing. Since the attachment to the connected partner with the jacket fixture being held is difficult in the case of the configuration wherein the ferrule, the mechanical splice, and the jacket fixture are coupled and wherein the ferrule's back motion can occur as described above, the attachment to the connected partner with the outer housing or the member coupled to the outer housing being held is particularly effective.

The optical connector is characterized as follows: the jacket fixture is divided, and comprises a jacket fixture body coupled to the mechanical splice side, and a first movable portion and a second movable portion each comprising a guide portion slidable in the axial direction relative to the jacket fixture body; the first movable portion is arranged to slide to the tip side in a state in which the jacket holder holding the cable jacket is mounted thereon, to be housed into the second movable portion; the second movable portion is arranged to slide to the tip side so that the jacket holder is located at a predetermined position in the jacket fixture body where the optical fiber led out from the cable jacket butts the short fiber; the jacket fixture body comprises a lid for fixing the jacket holder to the jacket fixture body when closed, in a state in which the jacket holder is located at the predetermined position.

Namely, the optical connector of the present invention is preferably configured as follows: it further comprises a jacket holder for holding the cable jacket; the jacket fixture has a jacket fixture body coupled to the mechanical splice, and a first movable portion and a second movable portion each of which comprises a guide portion slidable in the predetermined axial direction relative to the jacket fixture body; the first movable portion is arranged to slide to the one side with the jacket holder being mounted thereon, to be housed into the second movable portion; the second movable portion is arranged to slide to the one side so that the jacket holder is located at a predetermined position in the jacket fixture body where the optical fiber led out from the cable jacket butts the short fiber; and the jacket fixture body has a lid for fixing the jacket holder to the jacket fixture body when closed, in a state in which the jacket holder is located at the predetermined position.

In this configuration, the jacket holder holding the cable jacket is mounted on the first movable portion, this first movable portion is slid to the tip side to be housed into the second movable portion, this second movable portion is slid to the tip side to locate the jacket holder at the predetermined position in the jacket fixture body, whereby the optical fiber led out from the cable jacket comes to butt the short fiber, and the lid is closed to fix the jacket holder to the jacket fixture body. For this reason, improvement is made in assembly performance of the optical connector. The optical connector of this configuration is effective particularly in the case where it is used in a rosette.

A portion associated with connection to the connected partner, e.g., the outer housing, is preferably comprised of any one of polyetherimide, PPS, PBT, polycarbonate, and PES (polyether sulfone). Since the portion made of such a material has excellent heat resistance and creep resistance, it is optimal for long-term use.

In a preferred configuration the optical connector of the present invention is configured as follows: it further comprises an other ferrule incorporating an other short fiber extending in the predetermined axial direction; an other mechanical splice having a fixing portion and a holding portion in order from the one side to the other side in the predetermined axial direction, and adapted so that the fixing part mechanically fixes the other short fiber extending from the other ferrule held by the holding part, toward the one side, and an optical fiber in an other optical cable introduced from the one side to butt the other short fiber; a housing comprising a housing part having a cylindrical shape extending in the predetermined axial direction and internally housing the other mechanical splice, an adapter continuing to an end on the other side of the housing part and adapted for optically coupling the other ferrule to the ferrule, a base part continuing to an end on the one side of the housing part, and a lid for opening and closing the base part; and a holder placed at a predetermined position in the base part while holding a cable jacket of the other optical cable, and fixed to the base part when the lid is closed; the base part is provided with a mechanical-splice stopper having a contact surface to contact an end on the one side of the other mechanical splice; and the mechanical-splice stopper is provided with a groove for guiding the optical fiber led out from the cable jacket of the other optical cable, to the fixing part.

Namely, the optical connector of the present invention can comprise a male optical connector (optical connector plug) to be connected to an optical fiber in an optical cable, and a female optical connector (optical adapter) to be connected to this male optical connector. This male optical connector comprises the aforementioned ferrule, mechanical splice, outer housing, and jacket fixture. The female optical connector comprises the aforementioned other ferrule, other mechanical splice, housing, and holder, and is connected to an optical fiber of another optical cable.

An assembling method of an optical connector according to another aspect of the present invention is a method comprising: removing a tension member of an optical cable to expose a coated fiber; putting a cable jacket into a holder to be held thereby; removing a predetermined length of a coating of the coated fiber to expose an optical fiber, and cutting a tip thereof; guiding the optical fiber into an interior of a jacket fixture through a slit provided as located above the jacket fixture and opened from a rear side to establish communication between inside and outside, and mounting the optical fiber on a fiber penetrating portion to a mechanical splice exposed through a window provided as located above the jacket fixture; moving the holder toward the mechanical splice in an open state, to house the holder in the jacket fixture, and, after confirming butting of the optical fiber, bringing the mechanical splice into a closed state to mechanically fix a butting portion; and unslackening the coated fiber and thereafter fixing the holder to the jacket fixture.

The assembling method of the optical connector as described above permits a worker to readily and stably assemble at a job site, the optical connector in the simple configuration which prevents the coated optical fiber from being subject to an excessive force such as a bending force from the outside during a work and which is readily connected to the connected partner.

Another optical connector according to still another aspect of the present invention is an optical connector comprising a mechanical splice which holds a ferrule with a short fiber therein, at a tip, into which an optical fiber in an optical cable of a tight structure in which a coated fiber obtained by coating the optical fiber is attached tightly to a cable jacket covering the coated fiber, is guided from the back, and which mechanically fixes a butting portion between the optical fiber and the short fiber, the optical connector comprising: a housing comprising a housing part for housing the mechanical splice, an adapter located on a tip side of the housing part and adapted for connecting the ferrule to a connected partner, a base part located on a rear side of the housing part and extending in a predetermined direction, and a lid for opening and closing the base part; and a holder placed at a predetermined position in the base part of the housing while holding the cable jacket, and fixed to the base part when the lid is closed.

Namely, another optical connector according to still another aspect of the present invention is an optical connector to be connected to an optical fiber in an optical cable of a tight structure in which a coated fiber obtained by coating the optical fiber is attached tightly to a cable jacket covering the coated fiber, the optical connector comprising: (a) a ferrule incorporating a short fiber extending in a predetermined axial direction; (b) a mechanical splice having a holding part and a fixing part in order from a one side to an other side in the predetermined axial direction, and adapted so that the fixing part mechanically fixes the short fiber extending from the ferrule held by the holding part, toward the other side, and the optical fiber in the optical cable introduced from the one side to butt the short fiber; (c) a housing comprising a housing part having a cylindrical shape extending in the predetermined axial direction and internally housing the mechanical splice, an adapter continuing to an end on the one side of the housing part and adapted for optically coupling the ferrule to an other ferrule, a base part continuing to an end on the other side of the housing part, and a lid for opening and closing the base part; and (d) a holder placed at a predetermined position in the base part while holding the cable jacket, and fixed to the base part when the lid is closed.

In this optical connector, the housing forming the optical connector is arranged to have the adapter, and thus this configuration reduces the number of connections and the number of parts. The holder holding the cable jacket is placed in the base part of the housing and the lid is closed to fix the holder to the housing; therefore, this simple configuration prevents the coated fiber exposed from the cable jacket, from being subject to an excessive force such as a bending force from the outside during a work. The conventional technology sometimes required the storage of the coated fiber on the storage tray or the like, whereas the optical connector of the present invention eliminates the need for the storage on the storage tray or the like and thus achieves reduction of production cost and improvement in workability.

Preferably, the base part comprises a mechanical-splice stopper for fixing the mechanical splice from the back side and this mechanical-splice stopper is provided with a groove for guiding the optical fiber led out from the cable jacket. Namely, preferably, the base part is provided with a mechanical-splice stopper having a contact surface to contact an end on the other side of the mechanical splice, and the mechanical-splice stopper is provided with a groove for guiding the optical fiber led out from the cable jacket, to the fixing part.

In this configuration, the groove of the mechanical-splice stopper serves as a guide for the coated fiber to facilitate placement of the coated fiber and improve workability. The coated fiber is prevented from touching the surroundings, so as to prevent breakage of the coated fiber. When this groove is located on the upper side, it enhances visibility and further improves workability.

When the optical connector has a configuration for temporarily fixing the holder at the predetermined position in the base part, it prevents the holder from deviating from the predetermined position and from dropping before closing of the lid, and it improves workability.

When the connected partner is an SC connector, a preferred configuration is such that the adapter houses an attachment with a locking claw for attachment of the SC connector inserted therein and that the locking claw is arranged not to project out from a leading end face of the adapter. Namely, when this optical connector is one to be connected to the SC connector, the optical connector further comprises an attachment with a locking claw for attachment of the connector, and the adapter houses the attachment.

In this configuration, the attachment enables connection to the connector, and enhances general versatility. By the configuration wherein the locking claw is arranged not to project out from the leading end face of the adapter, the locking claw is not used as a guide for the SC connector, but the adapter serves as a guide for the SC connector; therefore, the SC connector is readily attached.

Preferably, the base part and the lid both are arranged to extend in a direction at an angle (except for 0°) relative to the axis of the ferrule. Namely, preferably, the base part and the lid are bent to a predetermined direction intersecting at a predetermined angle with the predetermined axial direction. For example, where the coated fiber is bent to the predetermined direction, for example, an oblique direction or a right-angle direction, the cable jacket can be made to extend in the predetermined direction without bending of the cable jacket (optical cable), and the lengths of the optical connector and the optical cable can be reduced by the degree of bending the coated fiber instead of bending the cable jacket.

The larger width direction of the cable jacket (the direction of juxtaposition of tension members) is 90° different between a case where the optical cable is applied to a cabinet and a case where the optical cable is applied to an outlet, and with the above-described holder there can arise a situation in which the cable jacket has to be bent into the larger width direction of the cable jacket in which it is hard to be bent. For this reason, the optical connector comprises an other holder for holding the cable jacket in place of the aforementioned holder, and this other holder holds the cable jacket from the same direction as the aforementioned holder, and has a configuration for fixing the cable jacket to the base part in a state in which the direction is changed by 90° about the axis relative to the holder; the other holder readily changes the larger width direction of the cable jacket by 90° to permit easy bending, and permits the optical cable to be readily applied to a cabinet or an outlet.

The optical connector may be configured as follows: a thickness of the cable jacket in one direction is smaller than a thickness in an other direction perpendicular to the one direction; and the holder holds the cable jacket from both sides of the one direction and is placed in the base part so that the other direction of the cable jacket becomes approximately equal to the predetermined axial direction inside the base part. This configuration enables the cable jacket led out from the base part, to be readily bent into the direction intersecting with the predetermined axial direction. Therefore, this optical connector can be readily applied to a cabinet.

Preferably, a thickness of the cable jacket in one direction is smaller than a thickness in an other direction perpendicular to the one direction and the holder holds the cable jacket from both sides of the one direction and is placed in the base part so that the other direction of the cable jacket is approximately perpendicular to the predetermined axial direction and the predetermined direction inside the base part. This configuration permits the cable jacket led out from the base part, to be readily bent into the direction intersecting with the predetermined axial direction, and further into the predetermined axial direction. Therefore, this optical connector can be readily applied to an outlet.

The optical connector is characterized as follows: the base part comprises a base part body linearly extending backward and being divided and coupled to the housing part, and a movable base portion with a guide part slidable in the axial direction relative to the base part body, and the movable base portion is arranged to slide to the leading end side so that the holder is located at a predetermined position in the base part body where the optical fiber led out from the cable jacket butts the short fiber, in a state in which the holder holding the cable jacket is mounted thereon; the lid is closed to fix the holder to the base part body.

Namely, the optical connector may be configured as follows: the base part has a base part body coupled to one end on the other side of the housing part, and a movable base portion having a guide part slidable in the predetermined axial direction relative to the base part body; the movable base portion is slid with the holder being mounted thereon so that the holder is located at a predetermined position in the base part body where the optical fiber led out from the cable jacket butts the short fiber; and when the lid is closed, the holder is fixed to the base part body.

In this configuration, the holder holding the cable jacket is mounted on the movable base portion, this movable base portion is slid to the leading end side to be located at the predetermined position in the base part body, the optical fiber led out from the cable jacket comes to butt the short fiber, and the lid is closed to fix the holder to the base part body. For this reason, improvement is made in assembly performance of the optical connector. The optical connector of this configuration is effective particularly to use in a rosette.

In a preferred configuration a portion associated with connection to a connected partner, e.g., the housing, is comprised of any one of polyetherimide, PPS, PBT, polycarbonate, and PES. Since these materials have excellent heat resistance and creep resistance, they are optimal for long-term use of the portion.

An assembling method of an optical connector according to the present invention comprises: removing a tension member of an optical cable to expose a coated fiber; putting a cable jacket into a holder to be held thereby; removing a predetermined length of a coating of the coated fiber to expose an optical fiber, cutting a tip of the optical fiber, inserting the optical fiber from a rear side of a mechanical splice in an open state, and, after confirming butting of the optical fiber, bringing the mechanical splice into a closed state to mechanically fix a butting portion; and temporarily fixing the holder at a predetermined position in a base part and thereafter closing the lid to fix the holder to the base part.

This assembling method of the optical connector reduces the number of connections and the number of parts and permits a worker to readily and stably assemble at a job site, the optical connector in the simple configuration which prevents the coated fiber exposed out of the cable jacket, from being subject to an excessive force such as a bending force from the outside during a work.

BRIEF DESCRIPTION OF THE DRAWINGS

FIG. 12 is a perspective view of a mechanical-splice stopper in FIG. 11.

BEST MODES FOR CARRYING OUT THE INVENTION

The preferred embodiments of optical connectors according to the present invention will be described below with reference to the drawings. In the description of the drawings, identical or equivalent elements will be denoted by the same reference symbols, without redundant description.

[First Embodiment]

Figure 1:
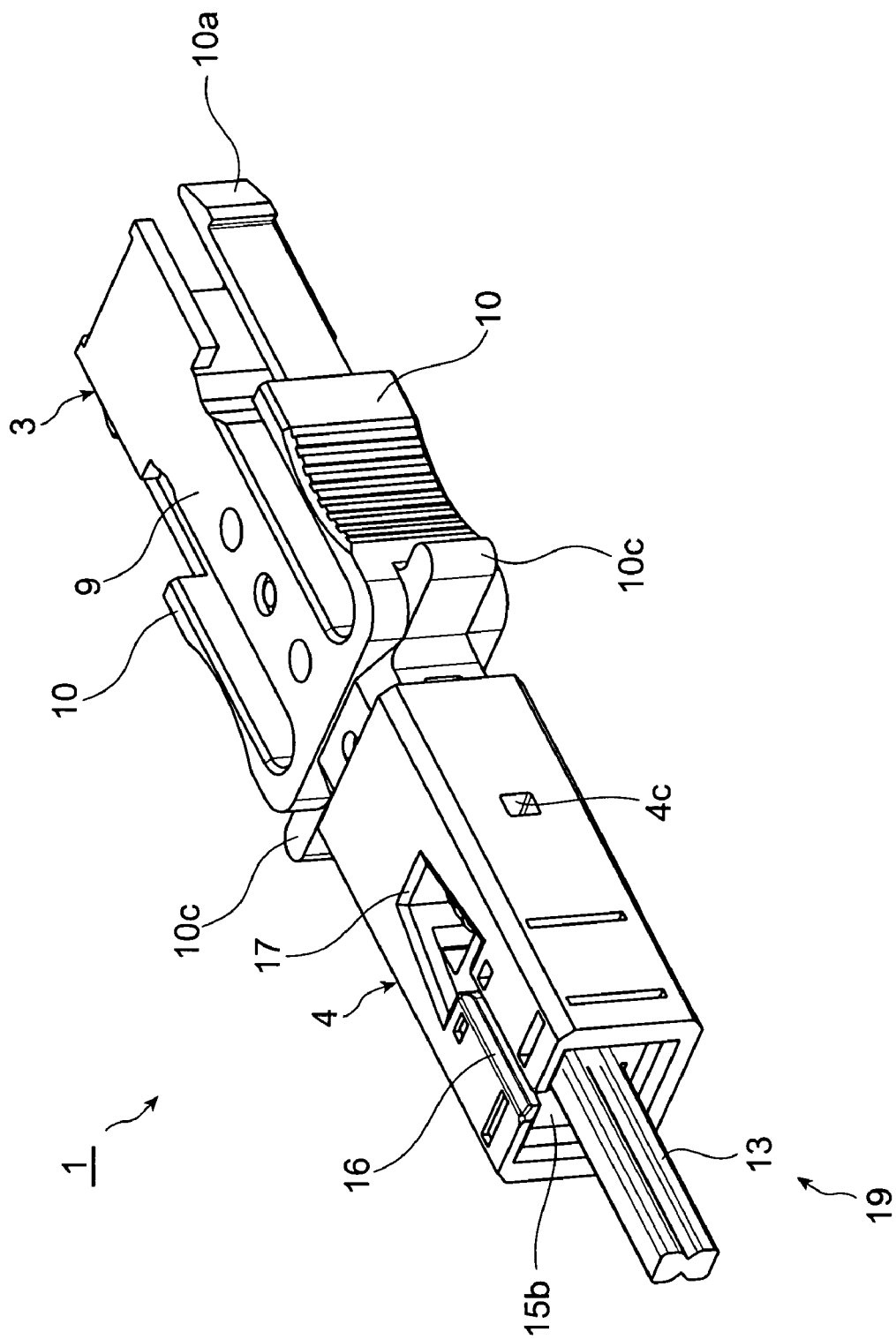
FIG. 1 is a perspective view of a male optical connector according to a first embodiment of the present invention.
Figure 2:
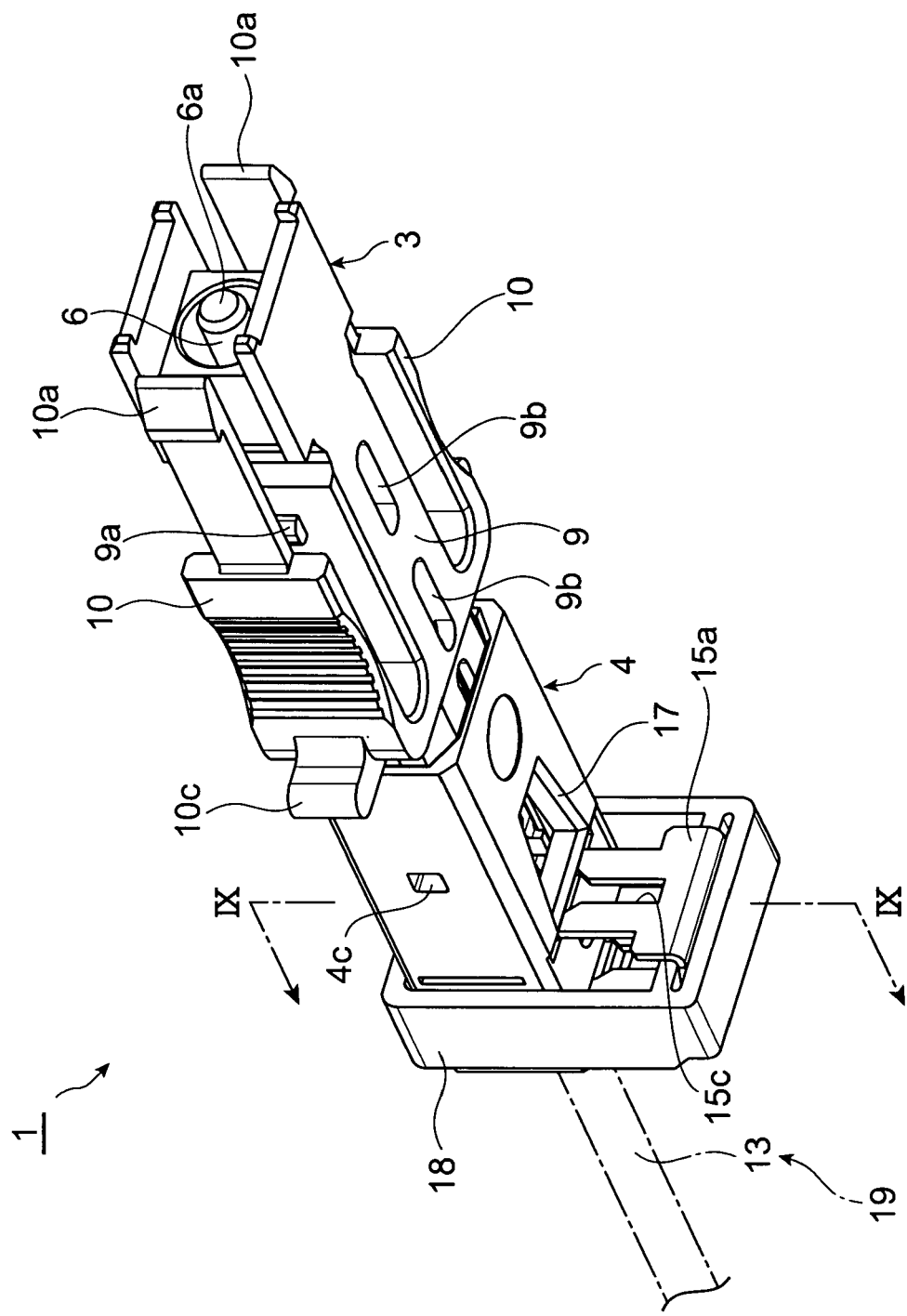
FIG. 2 is a perspective view of the lower side of the male optical connector shown in FIG. 1 (before insertion of a clip).
Figure 3:
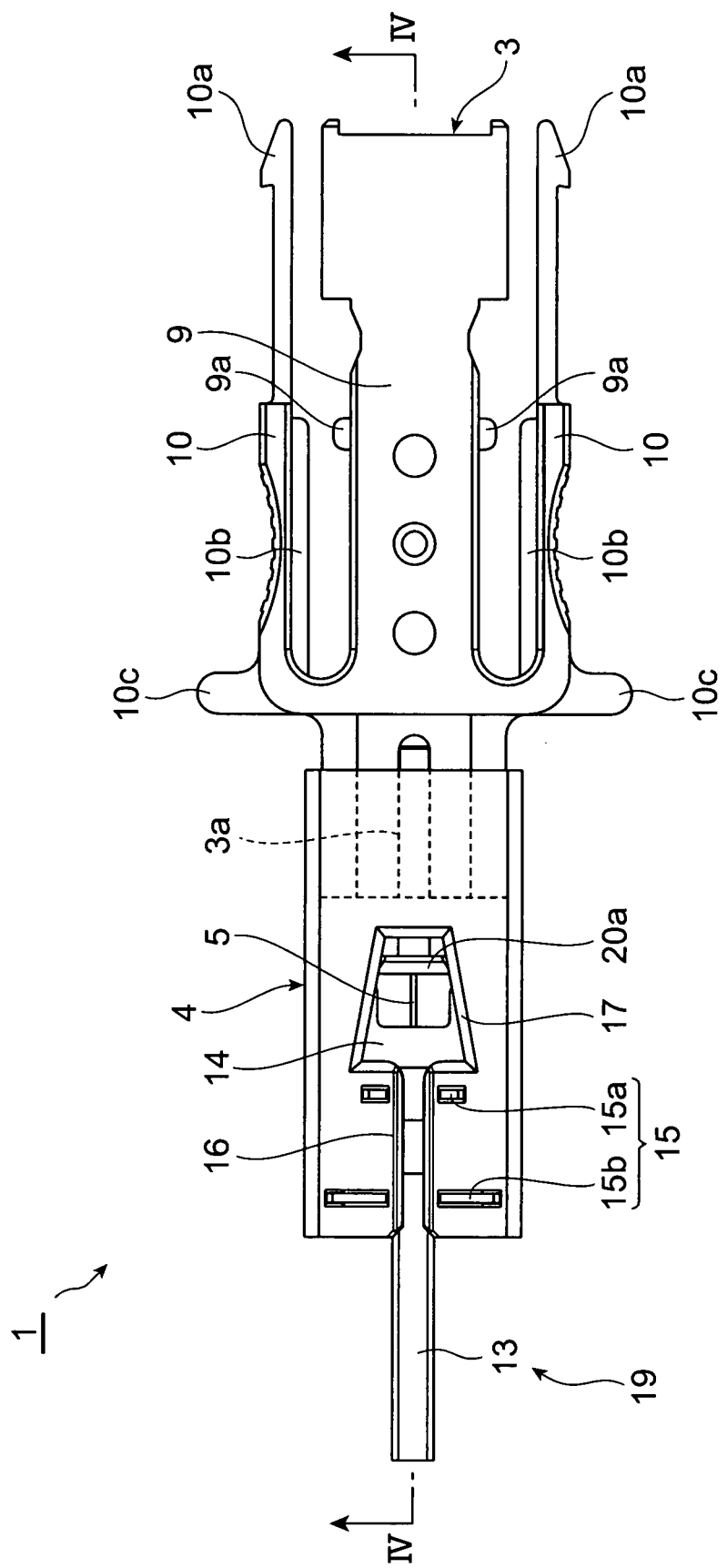
FIG. 3 is a top plan view of the male optical connector shown in FIG. 1.
Figure 4:
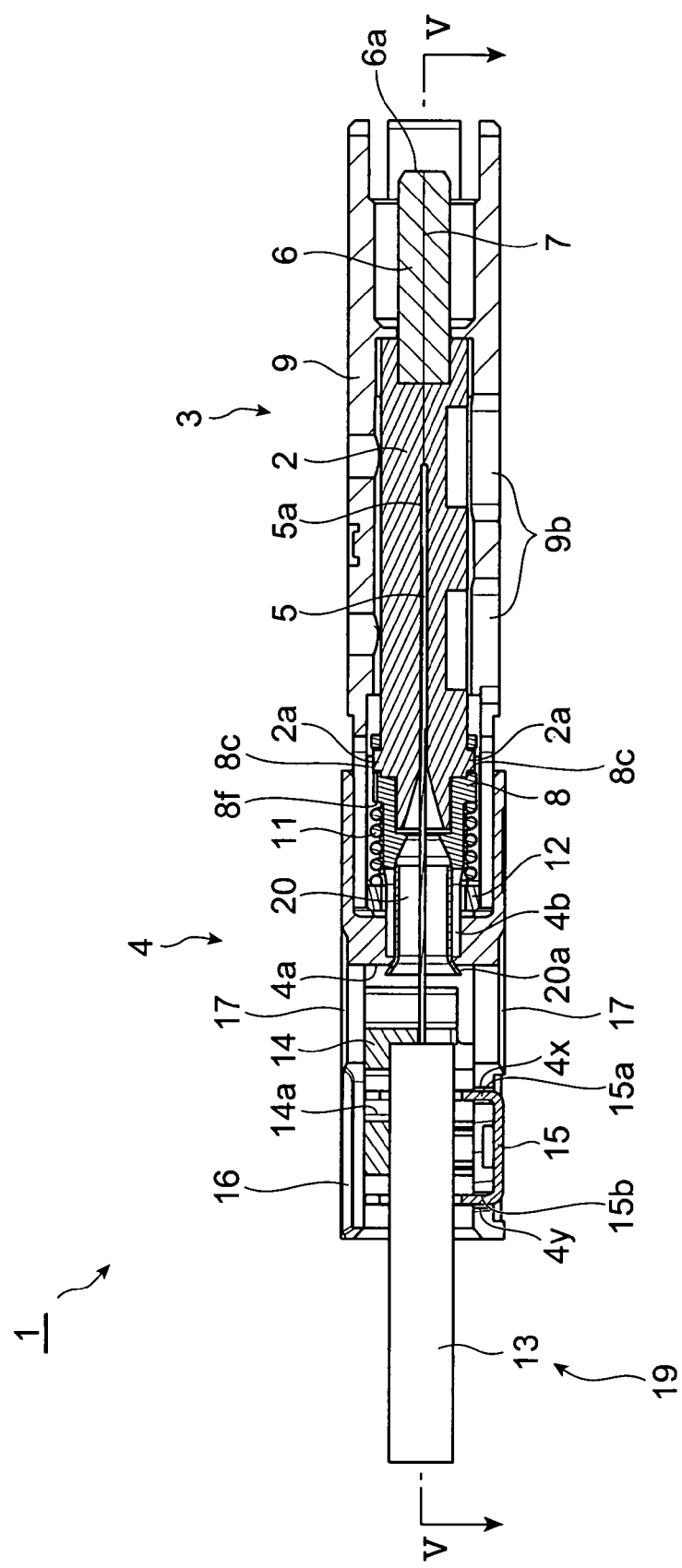
FIG. 4 is a sectional view on arrow taken along line IV-IV in FIG. 3.
Figure 5:
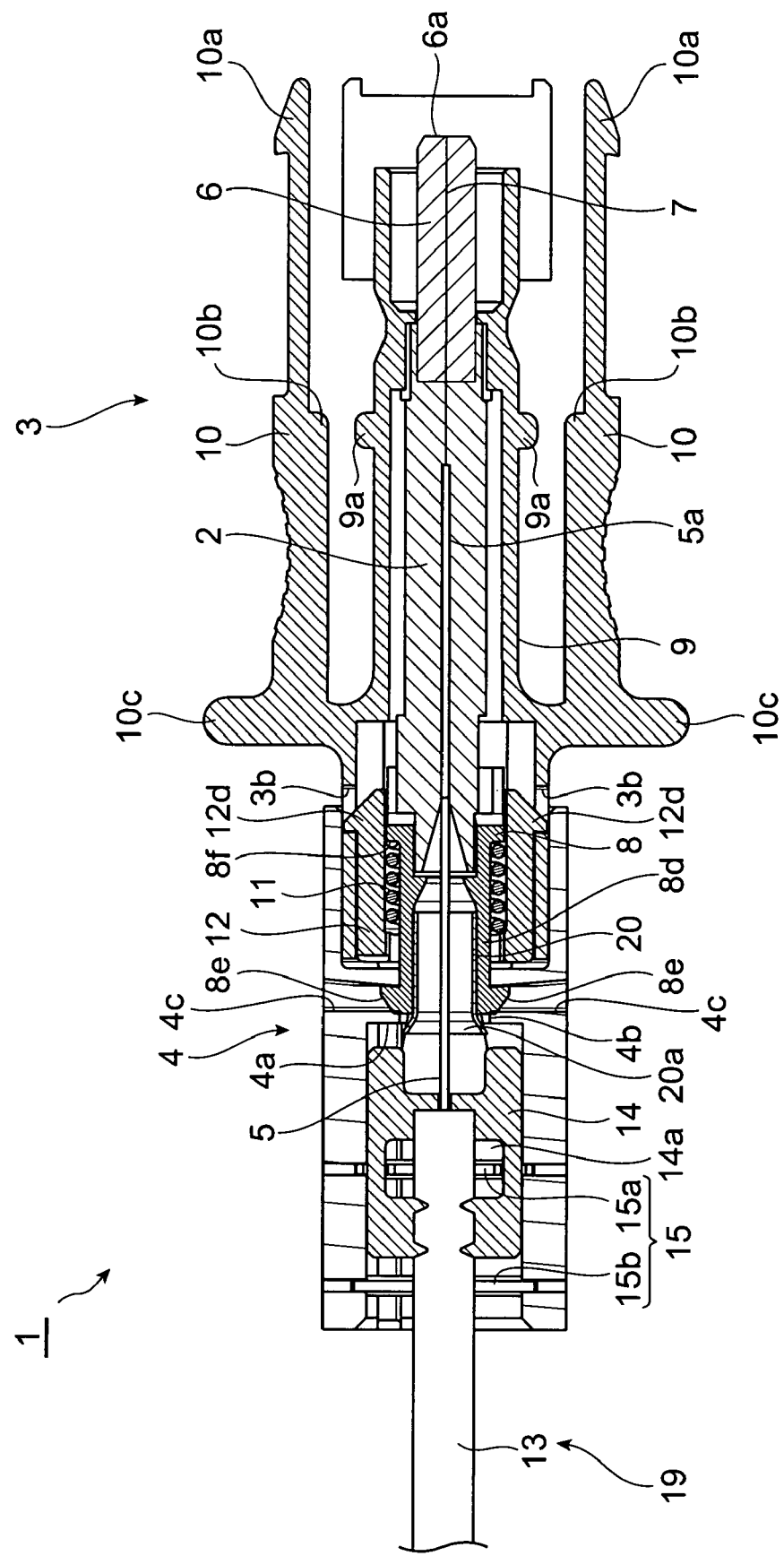
FIG. 5 is a sectional view on arrow taken along line V-V in FIG. 4.
Figure 6:
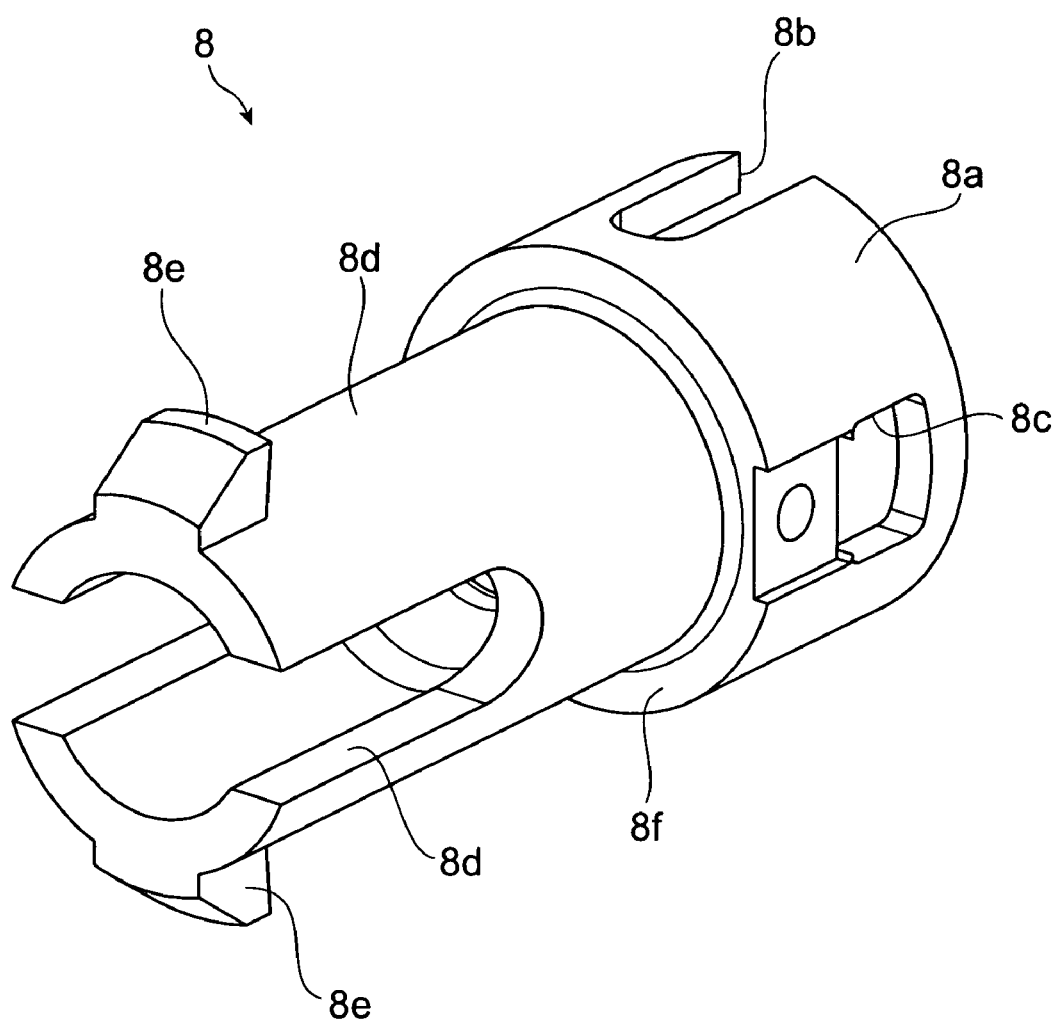
FIG. 6 is a perspective view of a coupling member in FIG. 5.
Figure 7:
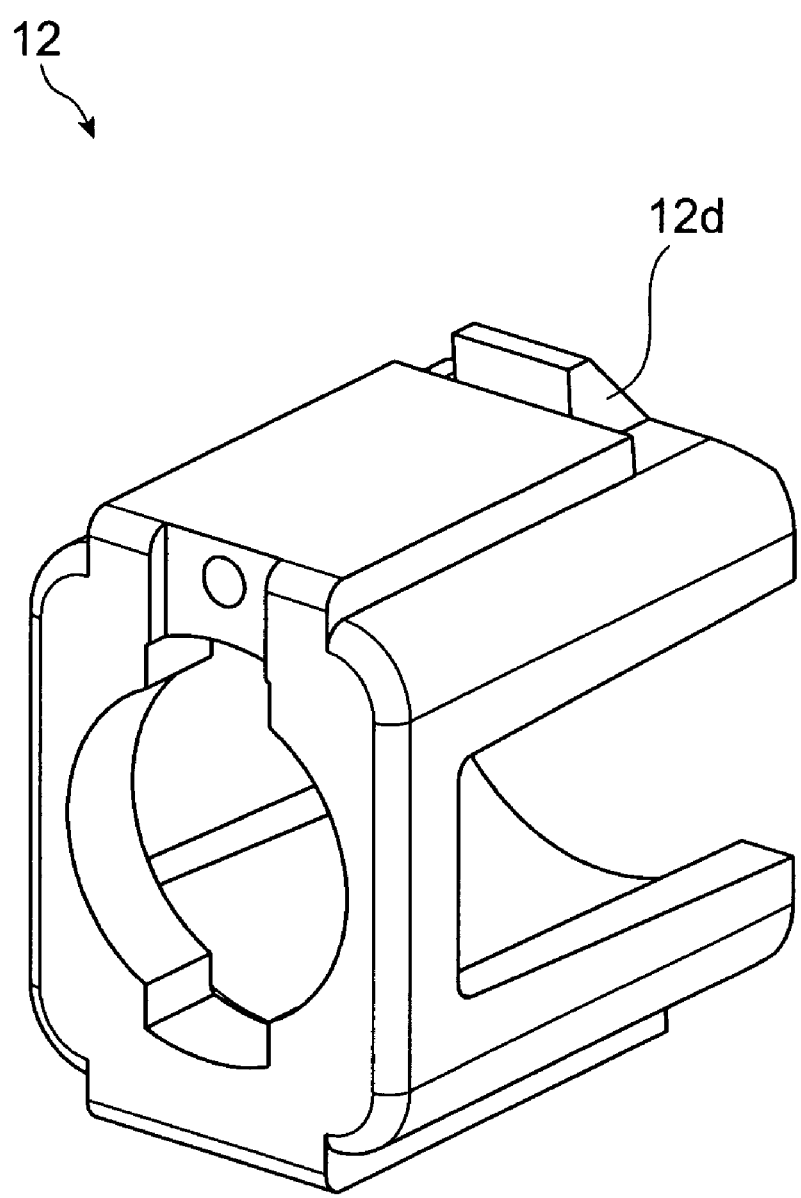
FIG. 7 is a perspective view of a spring push in FIG. 5.
Figure 8:
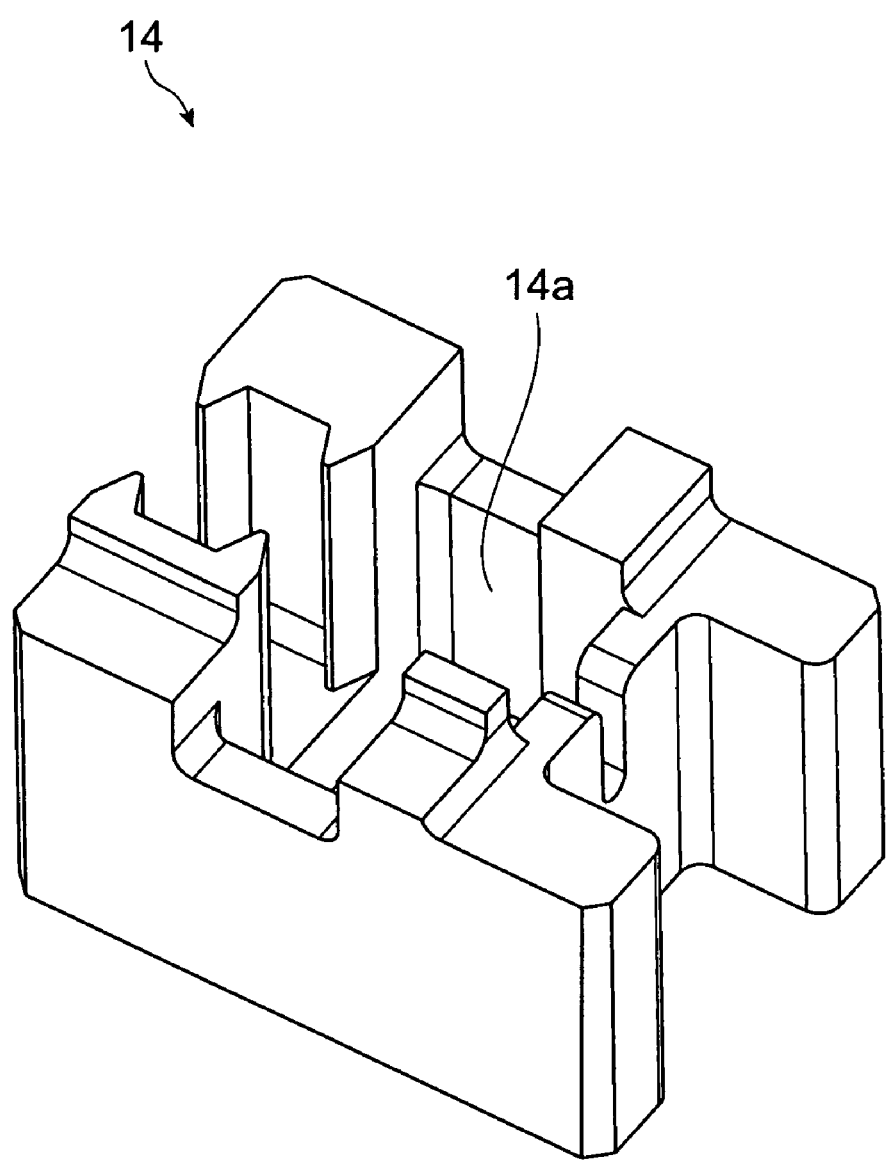
FIG. 8 is a perspective view of a jacket holder in FIG. 5.
Figure 9:
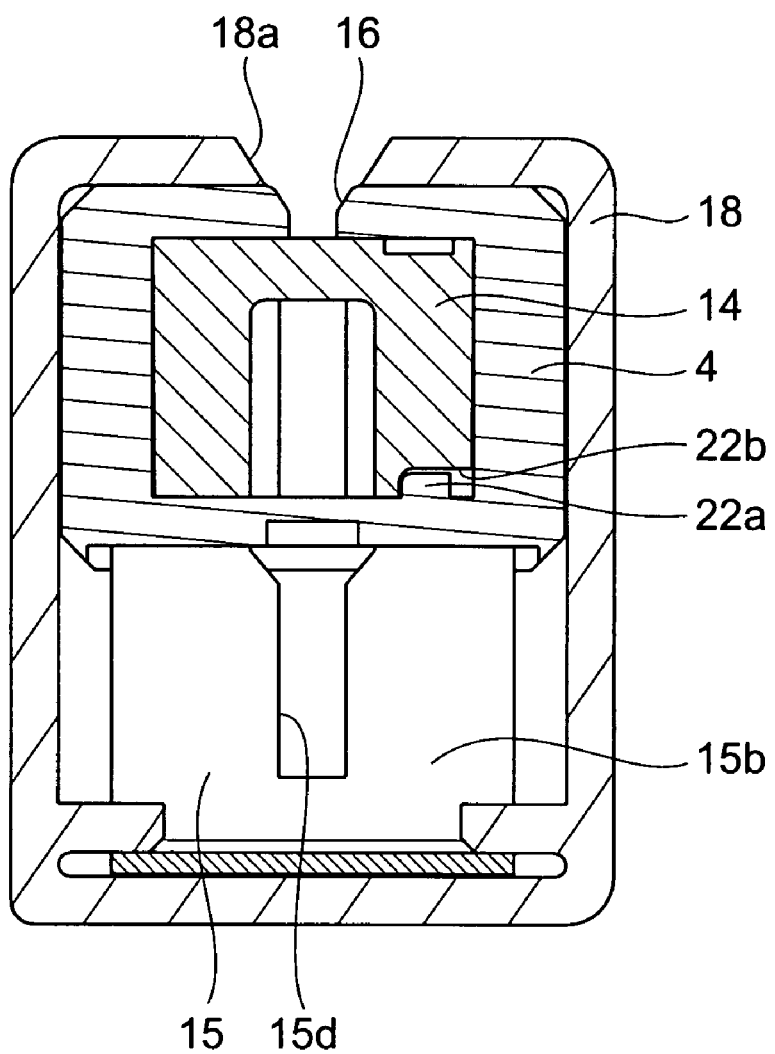
FIG. 9 is a sectional view on arrow along line IX-IX in FIG. 2.
Figure 18:
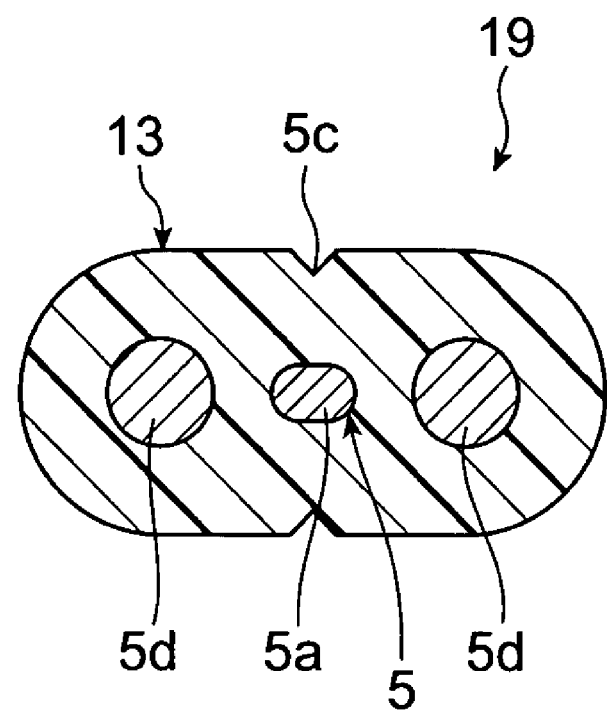
FIG. 18 is a transverse sectional view showing an indoor cable.

FIG. 1 is a perspective view of a male optical connector according to the first embodiment of the present invention, FIG. 2 a perspective view of the lower side of the male optical connector (before insertion of a clip) shown in FIG. 1, FIGS. 3 to 5 views showing the male optical connector, FIG. 6 a perspective view of a coupling member shown in FIG. 5, FIG. 7 a perspective view of a spring push shown in FIG. 5, FIGS. 8 and 9 views showing a jacket holder shown in FIG. 5, and FIG. 18 a transverse sectional view of an indoor cable. In the description hereinafter, terms indicating directions will be based on the state shown in FIG. 1. Specifically, a direction in which a jacket fixture is located relative to an outer housing is defined as "back."

The optical connector of the present embodiment is an in-situ assembling type single-fiber optical connector having a mechanical splice structure and being suitable for assembly at a job site, and is used for connection of an optical cable of a tight structure such as a drop cable or an indoor cable.

As shown in FIG. 18, an optical cable 19 of the tight structure used in this embodiment is constructed in a configuration in which a cable jacket 13 covers a coated fiber 5 obtained by coating an optical fiber 5a, and a pair of tension members 5d, 5d placed at positions on both sides of the coated fiber 5. In the optical cable 19, the coated fiber 5 and the tension members 5d, 5d are attached tightly to the cable jacket 13. The diameter of the coated fiber 5 in the present embodiment is 0.25 mm, but it is also possible to use the coated fiber in any one of various diameters such as 0.5 mm or 0.9 mm.

As shown in FIGS. 1 to 3, the male optical connector 1 of the first embodiment has an outer housing 3 forming the tip end side of the connector (the right side in the drawing), and a jacket fixture 4 forming the rear end side of the connector. An optical cable 19 is inserted into the male optical connector 1 from the rear end side of the jacket fixture 4 and a cable jacket 13 of the cable is fixed to the jacket fixture 4.

The outer housing 3, as shown in FIGS. 4 and 5, is provided with a mechanical splice housing part 9 housing a mechanical splice 2. This outer housing 3, as shown in FIGS. 1 to 3 and FIG. 5, is provided with a pair of arms 10 coupled to the mechanical splice housing part 9, located on both sides of the mechanical splice housing part 9, and projecting toward the tip end side. A material of this outer housing 3 to be adopted is polyetherimide, PPS, PBT, polycarbonate, or PES. These materials have excellent heat resistance and creep resistance and are thus optimal for long-term use.

The mechanical splice housing part 9 will be described below. This mechanical splice housing part 9 is of a rectangular cylinder shape extending in a predetermined axial direction. The mechanical splice housing part 9, as shown in FIGS. 4 and 5, houses a ferrule 6 and a mechanical splice 2 on the tip end side and houses a coupling member 8 for coupling the jacket fixture 4, a spring push 12 engaged with the outer housing 3, and a spring 11 disposed between the spring push 12 and the coupling member 8 and biasing the mechanical splice 2 toward the tip end side through the coupling member 8, on the rear end side.

The rear end side of the mechanical splice housing part 9 is provided with a pair of slits 3a opening from its rear end side, as shown in FIG. 3, in order to facilitate insertion of the spring push 12 into the interior thereof. Apertures 3b to be engaged with the spring push 12 are formed in peripheral surfaces on the rear end side of the mechanical splice housing part 9, as shown in FIG. 5.

The ferrule 6 is of a cylindrical shape extending in the predetermined axial direction. The ferrule 6 has an optical connection face 6a at its tip. A short fiber 7 is preliminarily fixed and built in this ferrule 6 with an adhesive or the like. This short fiber 7 has its tip end face exposed to the outside in the optical connection face 6a and has its rear end (the left side in the drawing) extending backward from the ferrule 6. Namely, the short fiber 7 is held by the ferrule 6 on one side in the predetermined axial direction and extends on the other side in the predetermined axial direction from the ferrule 6.

The mechanical splice 2 extends backward as arranged to cover the rear end of the ferrule 6. The mechanical splice 2 internally has a clearance and houses in the clearance, the short fiber 7 extending from the ferrule 6 and the optical fiber 5a exposed from the cable jacket 13 of the optical cable 19. The mechanical splice 2 can be brought from an open state into a closed state by pulling out a wedge (not shown) inserted through wedge inlets 9b (cf. FIGS. 2 and 4) formed in the mechanical splice housing part 9, into the mechanical splice 2. In this manner, the mechanical splice 2 is arranged to mechanically fix the butting portion between the short fiber 7 and the optical fiber 5a when brought from the open state into the closed state.

Namely, the mechanical splice 2 has a holding part and a fixing part in order from one side (tip end side) to the other side (rear end side) in the predetermined axial direction. This holding part holds the ferrule 6. The fixing part has the aforementioned clearance. An end face of the short fiber 7 extending from the ferrule 6 butts an end face of the optical fiber 5a in this clearance. After they butt each other in this manner, the short fiber 7 and the optical fiber 5a are fixed to the fixing part of the mechanical splice 2.

A pair of projections 2a for locking the coupling member 8 are provided, as shown in FIG. 4, on the peripheral surface in the rear end of the mechanical splice 2. Namely, the pair of projections 2a projecting in a direction intersecting with the predetermined axis are provided on the peripheral surface of the fixing part of the mechanical splice 2.

The coupling member 8 is arranged to cover the rear end part of the mechanical splice 2, as shown in FIGS. 4 and 5. As shown in FIG. 6, the coupling member 8 is of an approximately cylindrical shape extending in the predetermined axial direction. The tip end side (the right side in the drawing) of the coupling member 8 has a larger diameter than the rear end side with a step surface 8f (first contact face) in between. This step surface 8f faces the other side in the predetermined axial direction.

A pair of notches 8b opening from the tip end side and extending in the predetermined axial direction are formed in a peripheral surface 8a on the tip end side of the coupling member 8, and a pair of apertures 8c are provided at positions perpendicular to the notches 8b. The projections 2a of the mechanical splice 2 (cf. FIG. 4) are locked in the apertures 8c.

The coupling member 8 has a pair of flexible extensions 8d on its rear end side. Furthermore, the coupling member 8 has a pair of locking claws 8e for locking the jacket fixture 4, on the rear end side of the extensions 8d. This coupling member 8 houses a spacer (optical fiber penetrating part) 20 of a cylindrical shape, as shown in FIGS. 4 and 5, between the extensions 8d, 8d.

The spacer 20 is made, for example, of metal or plastic, and, as shown in FIGS. 4 and 5, is provided with a taper portion 20a with an opening expanded toward the rear end side, in order to facilitate insertion of the optical fiber 5a from the rear end side.

The spring push 12 is, as shown in FIG. 7, of an approximately rectangular cylinder shape extending in the predetermined axial direction. A pair of locking claws 12d are provided on the tip end side (the right side in the drawing) of the spring push 12 and the locking claws 12d are locked in the apertures 3b of the mechanical splice housing part 9.

The spring push 12 internally houses the coupling member 8 and a spring 11 arranged outside the coupling member 8, as shown in FIG. 5. As shown in FIG. 4, the spring 11 is interposed between an inner surface of the spring push 12, i.e., second contact surface facing the step surface 8f, and the step surface 8f of the coupling member 8, and biases the mechanical splice 2 toward the tip end side through the coupling member 8.

Next, the arms 10 of the outer housing 3 shown in FIGS. 1-3 and FIG. 5 will be described. The arms 10 are of a plate shape, are flexible in directions toward and away from the mechanical splice housing part 9, and spread slightly outward so as to facilitate attachment to a connected partner. A locking claw 10a projecting outward and being attachable to the connected partner is provided on the tip end side (the right side in the drawing) of each of the arms 10. Namely, the base ends of the arms 10 are supported on the mechanical splice housing part 9. The arms 10 have their respective locking claws 10a on the tip end side opposite to the base ends thereof. A pair of projections 10c projecting outward are provided on the root side, i.e., the base end side of the arms 10. The pair of projections 10c are used in attachment to the connected partner.

A rib 10b is provided, as shown in FIGS. 3 and 5, on a surface of each arm 10 facing the mechanical splice housing part 9. This rib 10b is formed from an intermediate part to the root of each arm 10. The rib 10b moderately enhances the rigidity of arm 10. The maximum principal stress of arm 10 including the locking claw 10a is not more than 29.4 MPa (3 kgf/mm$^2$) under the press load of 9.8 N (1 kgf).

Projections 9a for preventing excess inward flexure of the arms 10 are provided, as shown in FIGS. 2, 3, and 5, on outer surfaces of the mechanical splice housing part 9 facing the arms 10.

Next, the jacket fixture 4 forming the rear end side of the male optical connector 1 will be described. As shown in FIGS. 4 and 5, this jacket fixture 4 is of a rectangular cylindrical shape extending in the predetermined axial direction. The jacket fixture 4 is provided with a partition wall 4a for partitioning the interior of the fixture into a tip-side region and a rear-side region. This partition wall 4a is provided with an aperture 4b for communicating the tip-side region with the rear-side region.

The tip-side region of the jacket fixture 4 houses the rear end part of the outer housing 3 from the rear end of the outer housing 3 to near the roots of the arms 10. The rear-side region of the jacket fixture 4 houses a jacket holder 14 holding the cable jacket 13. The cable jacket 13 and the jacket holder 14 are fixed to the jacket fixture 4 by a clip 15. The rear-side region of the jacket fixture 4 also houses the taper portion 20a of the spacer 20 passing through the aperture 4b, as shown in FIGS. 4 and 5.

As shown in FIG. 5, the partition wall 4a is provided with a pair of apertures 4c. The pair of apertures 4c extend in the partition wall 4a toward the outer surfaces of the jacket fixture 4. The locking claws 8e of the coupling member 8 are locked in these apertures 4c.

As shown in FIGS. 1, 3, and 4, the upper surface of the jacket fixture 4 is provided with a slit 16 opening from the rear side and penetrating to the interior. This slit 16 is provided so as to facilitate insertion of the coated fiber 5 into the jacket fixture 4.

Furthermore, as shown in FIGS. 1 to 4, windows 17 for permitting one to view the taper portion 20a of the spacer (cf. FIGS. 3 and 4) are provided in the upper surface and in the lower surface of the jacket fixture 4.

The jacket holder 14, as shown in FIGS. 4 and 5, internally pinches and holds the cable jacket 13. This jacket holder 14, as shown in FIG. 8, has a penetrating part 14a vertically penetrating across the entire length of the jacket holder 14, and is arranged so that a nip plate 15a of clip 15 described later is inserted into this penetrating part 14a.

The clip 15, as shown in FIGS. 3 to 5, is constructed in an approximately U-shaped form with a pair of nip plates 15a, 15b in the axial direction, and is arranged so that the cable jacket 13 is pinched in slits 15c (cf. FIG. 2), 15d (cf. FIG. 9) formed in the respective nip plates 15a, 15b.

This clip 15 is inserted into holes opposite to holes 4x, 4y formed in the jacket fixture 4, as shown in FIG. 3, and is arranged so that it fixes the jacket holder 14 together with the cable jacket 13 to the jacket fixture 4, as shown in FIGS. 4 and 5. Since this clip 15 fixes the jacket holder 14 holding the cable jacket 13, and the cable jacket 13 both to the jacket fixture 4, firm fixing is achieved. Since the optical connector adopts the configuration wherein the nip plate 15a of the clip 15 is inserted into the penetrating part 14a of the jacket holder 14, the total length is shortened of the male optical connector 1 including the jacket fixture 4.

As shown in FIG. 9, a key projection 22a is provided on an inner surface of the jacket fixture 4 on the rear end side, and a notch 22b for enabling insertion of the key projection 22a is formed at the position corresponding to the key projection 22a in the jacket holder 14. This prevents the jacket holder 14 from being inserted in an inverted state into the jacket fixture 4.

Next, an assembling method of the male optical connector 1 in this configuration will be described briefly. Upon shipment from a factory to a job site, as shown in FIGS. 2 and 9, the male optical connector 1 is provided, for example, with a cap 18 of resin as a drop preventing means for preventing a drop of clip 15 during transportation, handling, and so on. The clip 15 is temporarily fixed by the cap 18 in a state in which it is inserted in the holes 4x, 4y of the jacket fixture 4. This cap 18, as shown in FIG. 9, is provided with a slit 18a at the position corresponding to the slit 16 of the jacket fixture 4.

At the job site, the optical cable 19 shown in FIG. 18 is first split along thin part 5c formed at the position where the coated fiber 5 is covered, to divide the cable jacket 13 including the tension members 5d on both sides, and the cable jacket 13 covering the tension members 5d is cut while exposing a predetermined length of the coated fiber 5 in the central region.

Then, as shown in FIGS. 4 and 5, the cable jacket 13 is put into the jacket holder 14 to be held thereby. Then the coating at the tip of the exposed coated fiber 5 is removed to expose the optical fiber 5a by a predetermined length. Then the stripped fiber 5a is cleaned and the tip of the optical fiber 5a is cut so as to adapt for optical connection.

Then the optical fiber 5a is led from the rear side of the slit 18a of the cap and the slit 16 of the jacket fixture 4 as shown in FIG. 9, to be located in the rear-side region of the jacket fixture 4 shown in FIGS. 4 and 5. After confirming that the notch 22b of the jacket holder 14 is located at the position corresponding to the key projection 22a of the jacket fixture 4 as shown in FIG. 9, the optical fiber 5a is then moved to the tip side to be inserted into the taper portion 20a of the spacer, as shown in FIGS. 4 and 5.

Then the insertion is continued to bring the jacket holder 14 into the rear-side region of the jacket fixture 4, and, after it is confirmed by visual observation of a slack of the coated fiber 5 or by hand's sense that the optical fiber 5a comes to butt the short fiber 7, the wedge is pulled out to bring the mechanical splice 2 into the closed state to mechanically fix the short fiber 7 and the optical fiber 5a.

Then the coated fiber 5 is unslackened and, after it is confirmed through the window 17 that there is no slack, the clip 15 is finally pushed together with the cap 18 shown in FIGS. 2 and 9, to fix the jacket holder 14 to the jacket fixture 4, thereby completing assembly of the male optical connector 1, as shown in FIGS. 1 and 3-5.

Figure 10:
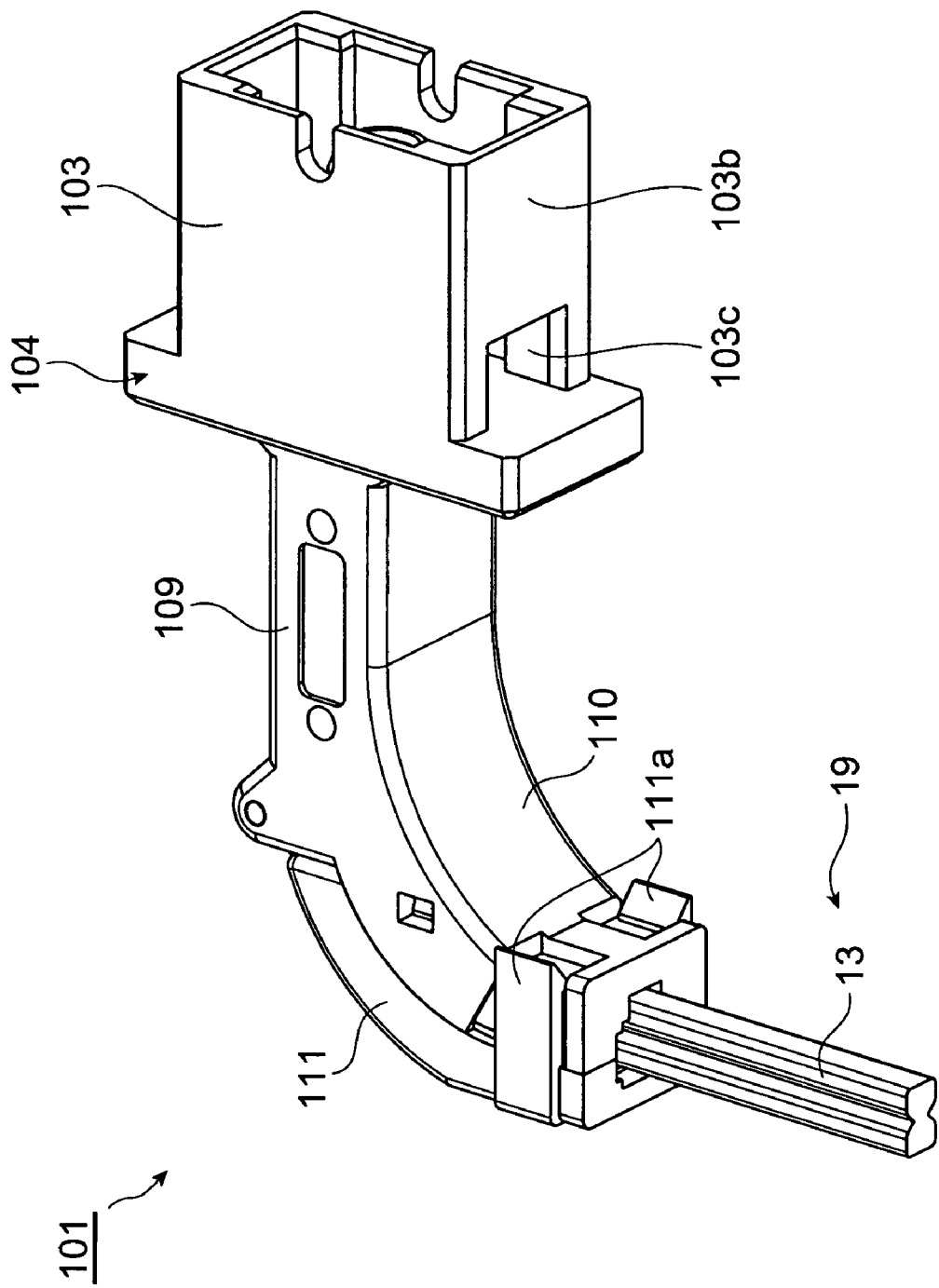
FIG. 10 is a perspective view showing a female optical connector according to the first embodiment of the present invention, which is a connected partner to the male optical connector shown in FIG. 1.
Figure 11:
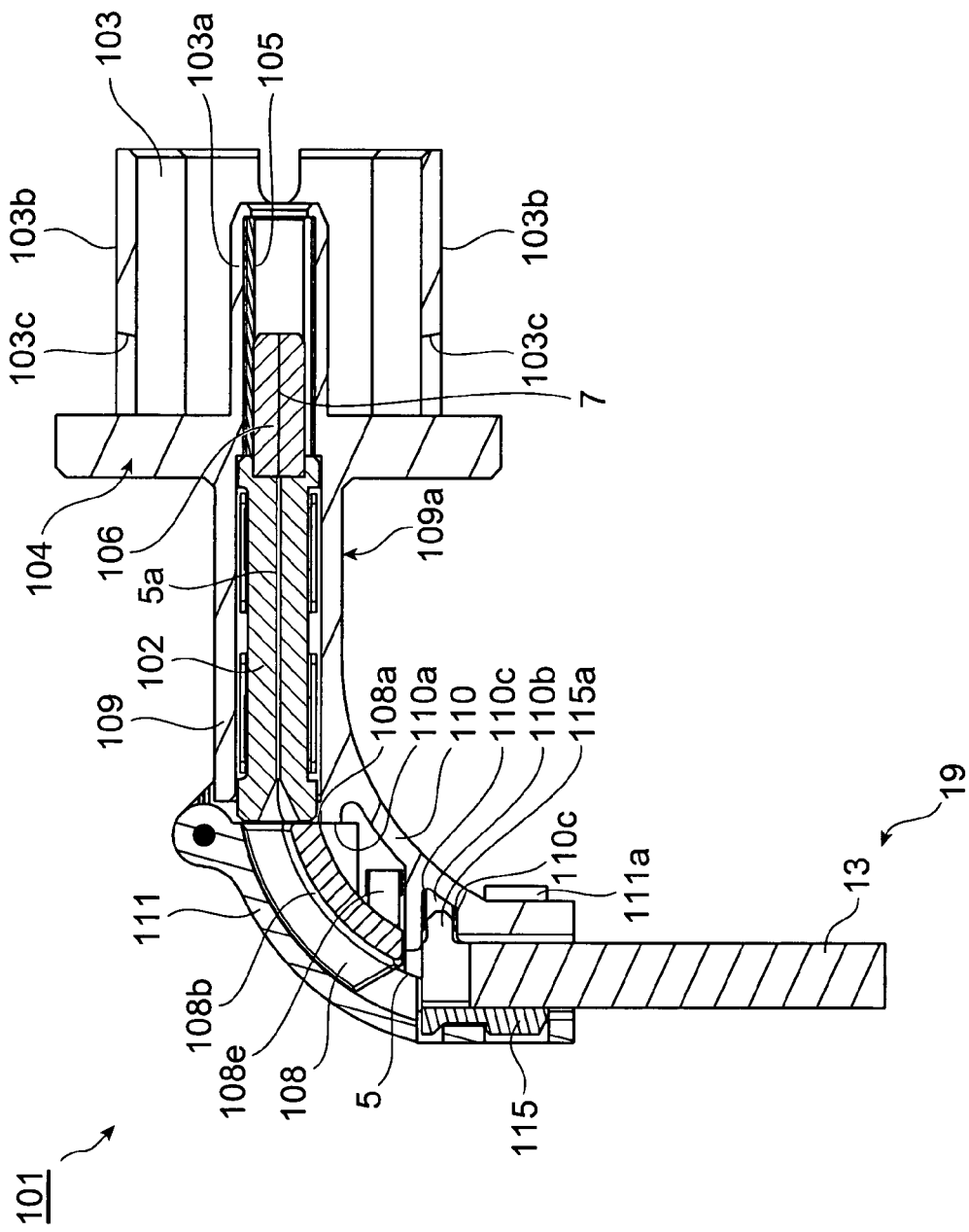
FIG. 11 is a horizontal sectional view of the female optical connector shown in FIG. 10.

Next, a female optical connector according to the first embodiment of the present invention will be described. This female optical connector is a connected partner to the male optical connector 1 assembled as described above. FIGS. 10 and 11 are drawings showing the female optical connector, FIG. 12 is a perspective view of a mechanical-splice stopper shown in FIG. 11, FIG. 14 a perspective view of a jacket holder (for cabinet) in FIG. 11, FIG. 13 a sectional view of another jacket holder (for outlet), and FIG. 15 an interior view of a base part shown in FIG. 10.

This female optical connector 101, as shown in FIGS. 10 and 11, is provided with a housing 104 forming its contour. This housing 104 has an adapter 103 forming its tip end side (the right side in the drawing), a mechanical splice housing part 109 for housing a mechanical splice 102 (cf. FIG. 11), a base part 110 coupled to the rear end side of the mechanical splice housing part 109, and a lid 111. Namely, the housing 104 has the adapter 103, mechanical splice housing part 109, and base part 110 in order from one side (tip end side) to the other side (rear end side) in the predetermined axial direction. The housing 104 also has the lid 111 for opening and closing the base part 110. A material of the housing 104 adopted is polyetherimide, PPS, PBT, polycarbonate, or PES. These materials have excellent heat resistance and creep resistance and are thus optimal for long-term use.

In this female optical connector 101, an optical cable 19 is inserted from the rear end side of the mechanical splice housing part 109 to fix the cable jacket 13 to the base part 110.

The adapter 103 is of a rectangular cylindrical shape extending in the predetermined axial direction and internally has a cylindrical part 103a, as shown in FIG. 11. This cylindrical part 103a houses a ferrule 106 and a split sleeve 105 for alignment covering the ferrule 106.

The ferrule 106 is of a columnar shape extending in the predetermined axial direction and incorporates a short fiber 7. This short fiber 7 extends in the predetermined axial direction from the ferrule 106 to the other side. The split sleeve 105 is a member of an approximately cylindrical shape and is provided on the same axis as the ferrule 106.

This adapter 103 has a pair of opposed side faces 103b, and a pair of apertures 103c for locking the male optical connector 1 as a connected partner are provided on the rear end side in the pair of side faces 103b. When the connected partner is a male optical connector of the SC structure, the apertures 103c are used for locking an attachment for SC connector housed in the adapter 103 (which will be detailed later).

The mechanical splice 102 is brought into a closed state when the wedge is pulled out, in the same manner as the mechanical splice 2 of the male optical connector 1, and it mechanically fixes a butting portion between the short fiber 7 extending from the ferrule 6, and the optical fiber 5a. Namely, the mechanical splice 102 has a holding part and a fixing part in order in the predetermined axial direction. This holding part holds the ferrule 106 and the fixing part fixes the short fiber 7 extending from the ferrule 106, and the optical fiber 5a in a butting state.

The base part 110 and the lid 111 are arranged to lead the cable jacket 13 out with a predetermined curvature and into a direction at 90° relative to the axial direction of the ferrule 106. Namely, the base part 110 and the lid 111 are bent into the predetermined direction which makes a predetermined angle with the predetermined axial direction.

The base part 110 houses a mechanical-splice stopper 108 for fixing the mechanical splice 102 from the back, and houses a jacket holder 115 for holding the cable jacket 13 so as to pinch the cable jacket 13.

Figure 15:
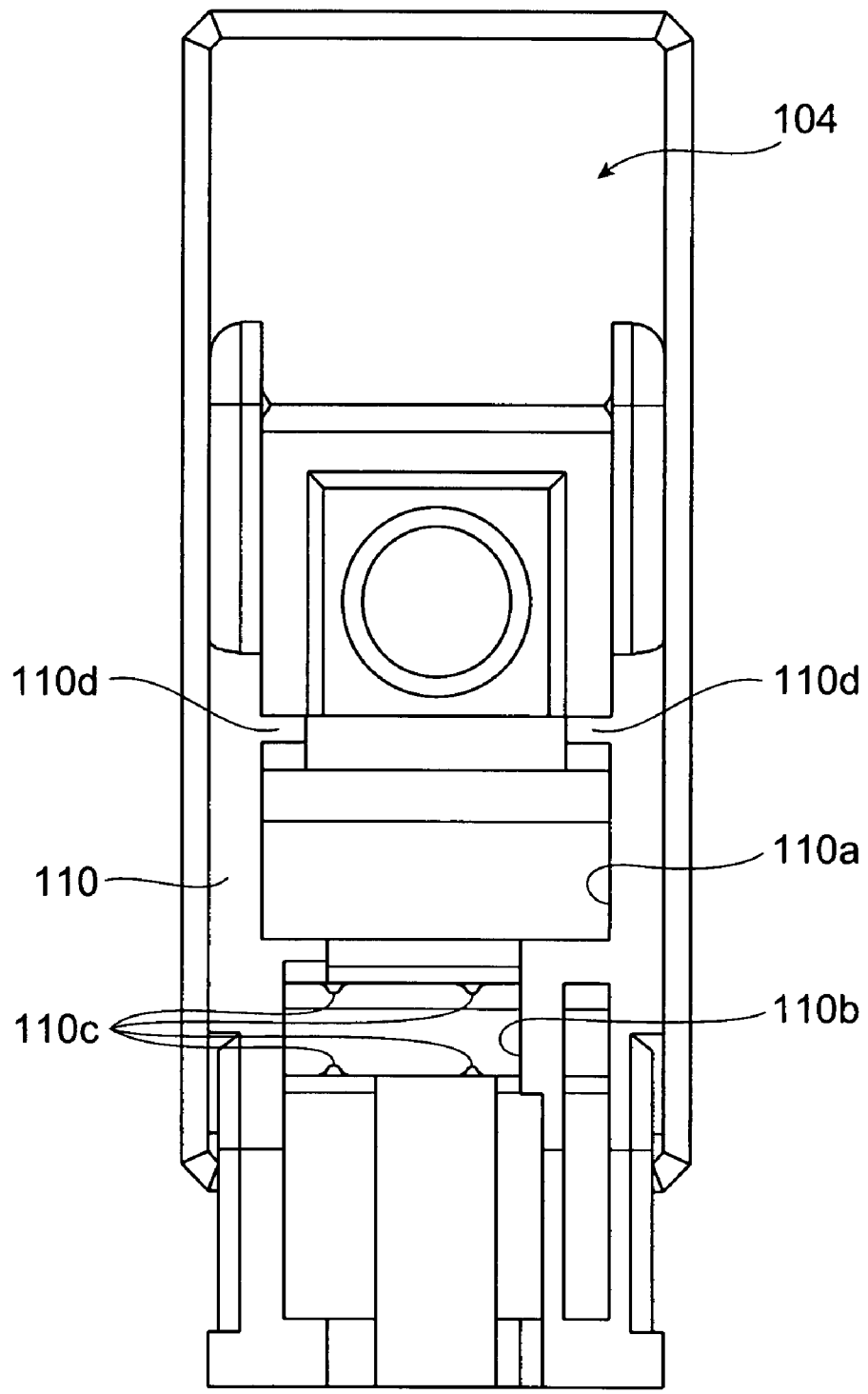
FIG. 15 is an interior view of a base part in FIG. 10.

The base part 110, as shown in FIGS. 11 and 15, is provided with a mechanical-splice stopper housing part 110a for housing the mechanical-splice stopper 108, a pair of guide projections 110d (cf. FIG. 15) for guiding the mechanical-splice stopper 108 in the axial direction of the ferrule 6, and a recess 110b into which a projection 115a of a jacket holder 115 is inserted. This recess 110b is provided with projections 110c (a configuration for temporarily fixing the holder at a predetermined position in the base part) for temporarily fixing the jacket holder 115 by frictional resistance. A pair of apertures (not shown) for locking the mechanical-splice stopper 108 are formed in the mechanical-splice stopper housing part 110a.

The mechanical-splice stopper 108, as shown in FIG. 11 and (a) and (b) in FIG. 12, has a surface 108a (contact surface) pushing the mechanical splice 102. This surface 108a is a face along a plane intersecting with the predetermined axis and is in contact with an end of the mechanical splice 102 on the rear end side.

The mechanical-splice stopper 108 has a curved surface 108b having such a curvature as to lead the coated fiber 5 out to the predetermined direction. A groove 108c for guiding the coated fiber 5 is formed in this curved surface 108b. The mechanical-splice stopper 108 has guide recesses 108d, and the guide projections 110d of the base part 110 shown in FIG. 15 are inserted into the associated guide recesses 108d. Furthermore, the mechanical-splice stopper 108, as shown in FIG. 12 (a) and FIG. 12 (b), has a pair of locking claws 108e, and the locking claws 108e are locked in the aforementioned apertures (not shown) of the base part 110 to be held in the base part 110.

Figure 14:
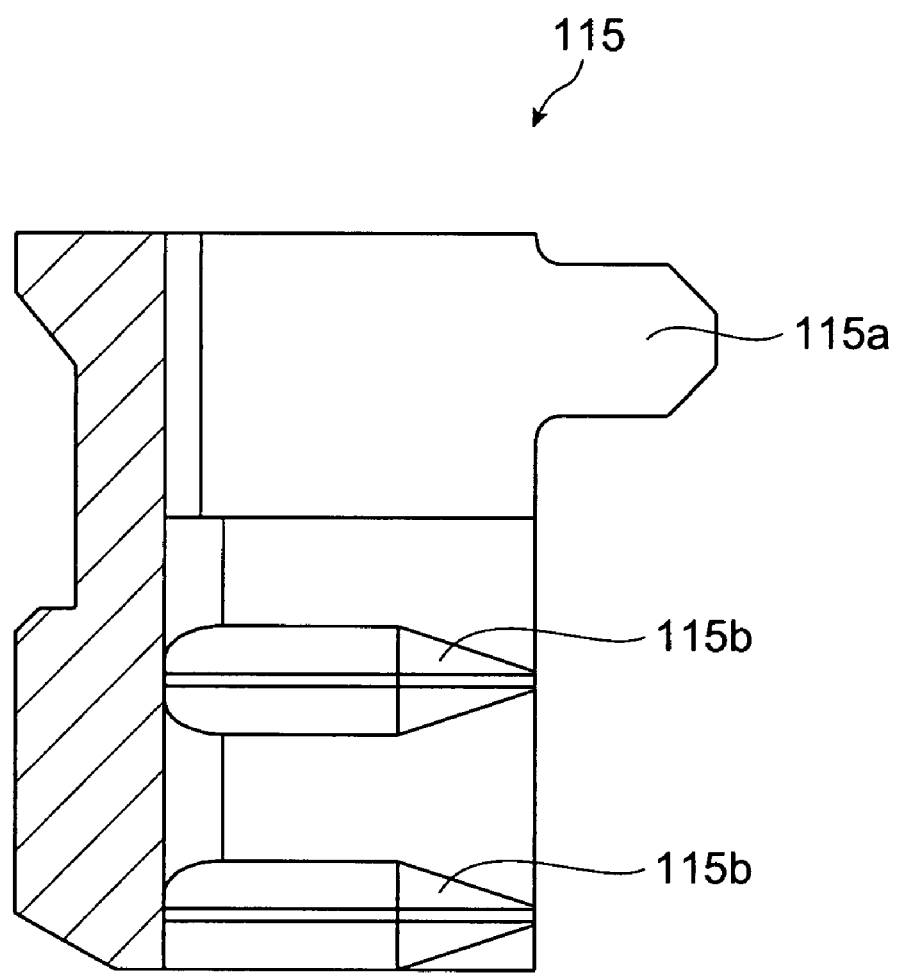
FIG. 14 is a sectional view of a jacket holder (for cabinet) in FIG. 11.

The jacket holder 115, as shown in FIGS. 11 and 14, is provided with a projection 115a, and this projection 115a is housed in the base part 110 in a state in which the projection 115a is inserted in the recess 110b of the base part 110, as shown in FIG. 11.

Figure 31:
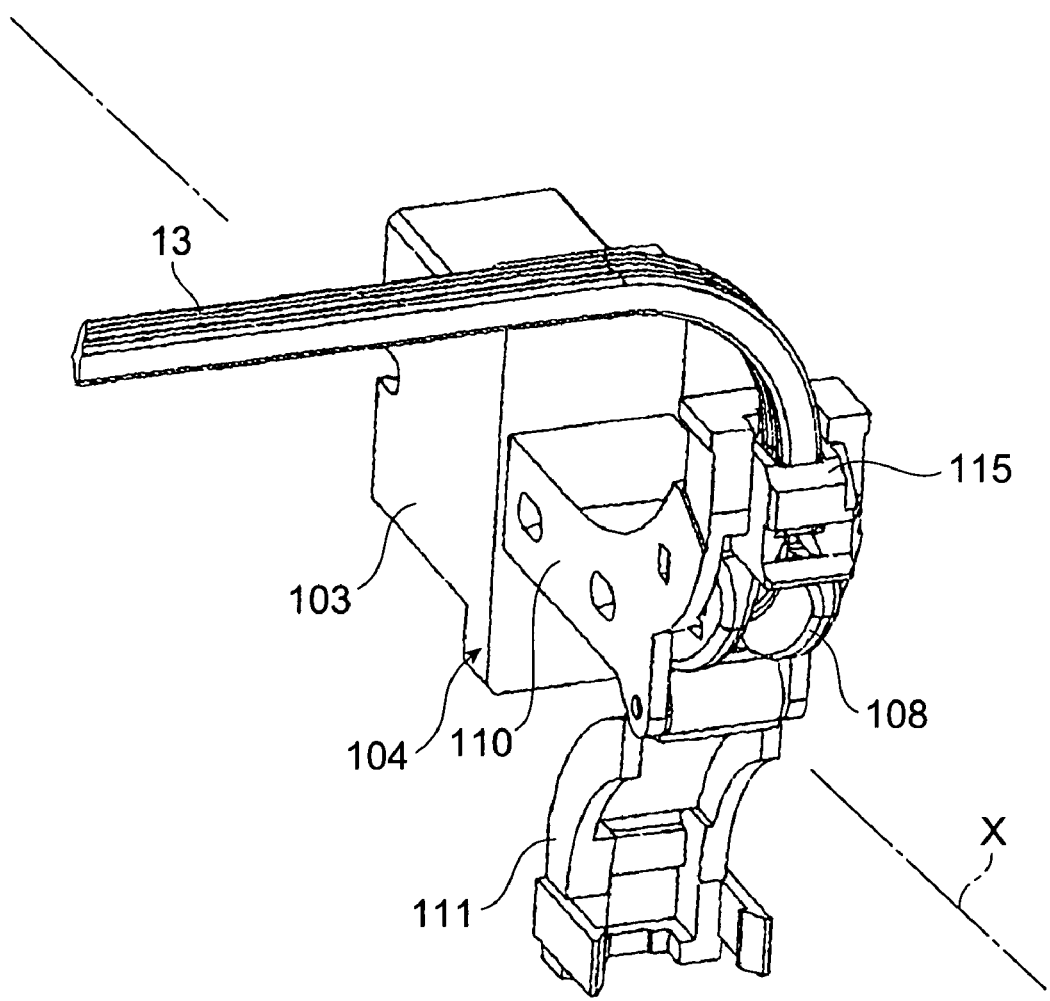
FIG. 31 is another perspective view of the female optical connector shown in FIG. 10.

As shown in FIG. 14, the jacket holder 115 is provided with claws 115b. The jacket holder 115 holds the cable jacket 13 so as to pinch the cable jacket 13 from the smaller width directions (the upper and lower surfaces in FIG. 18) by the claws 115b, as shown in FIG. 11. Namely, the thickness of the cable jacket 13 in one direction is smaller than the thickness of the cable jacket 13 in the other direction perpendicular to the one direction, and the jacket holder 115 holds the cable jacket 13 from both sides in the one direction. The jacket holder 115, as shown in FIG. 31, is placed in the base part 110 so that the aforementioned other direction of the cable jacket 13 becomes approximately coincident with the predetermined axial direction (the X-axis direction shown in FIG. 31). This enables the cable jacket 13 (optical cable 19) to be readily bent into the direction intersecting with the predetermined axial direction.

The lid 111, as shown in FIGS. 10 and 11, is attached to the rear end side of the mechanical splice housing part 109 by a hinge. This lid 111 is provided with a pair of locking claws 111a, and is closed when the locking claws 111a are engaged with the base part 110, whereby the lid comes to cover the mechanical-splice stopper 108 and the jacket holder 115 and to press the jacket holder 115 against the base part 110.

Next, an assembling method of the female optical connector 101 in this configuration will be described briefly. First, as described above, the tension members 5d are removed from the optical cable 19 shown in FIG. 18, to expose the coated fiber 5 by a predetermined length. Then the cable jacket 13 is pinched by the jacket holder 115 to be held thereby (cf. FIG. 11). Then the coating of the exposed coated fiber 5 is removed at the tip to expose the optical fiber 5a by a predetermined length. Then this stripped optical fiber 5a is cleaned and the optical fiber 5a is cut at its tip so as to adapt for optical connection.

Next, the optical fiber is inserted from the back side of the mechanical splice 102 in an open state, and, after it is confirmed that the optical fiber comes to butt, the wedge is pulled out to bring the mechanical splice 102 into a closed state to mechanically fix the butting portion. Thereafter, the coated fiber 5 is guided to and bent along the groove of the mechanical-splice stopper 108 and the projection 115a of the jacket holder 115 is forced into the recess 110b of the base part 110 to temporarily fix the jacket holder 115 by the projections 110c. Then the lid 111 is finally closed to fix the jacket holder 115 to the base part 110, thereby obtaining the female optical connector 101 shown in FIGS. 10 and 11.

Figure 16:
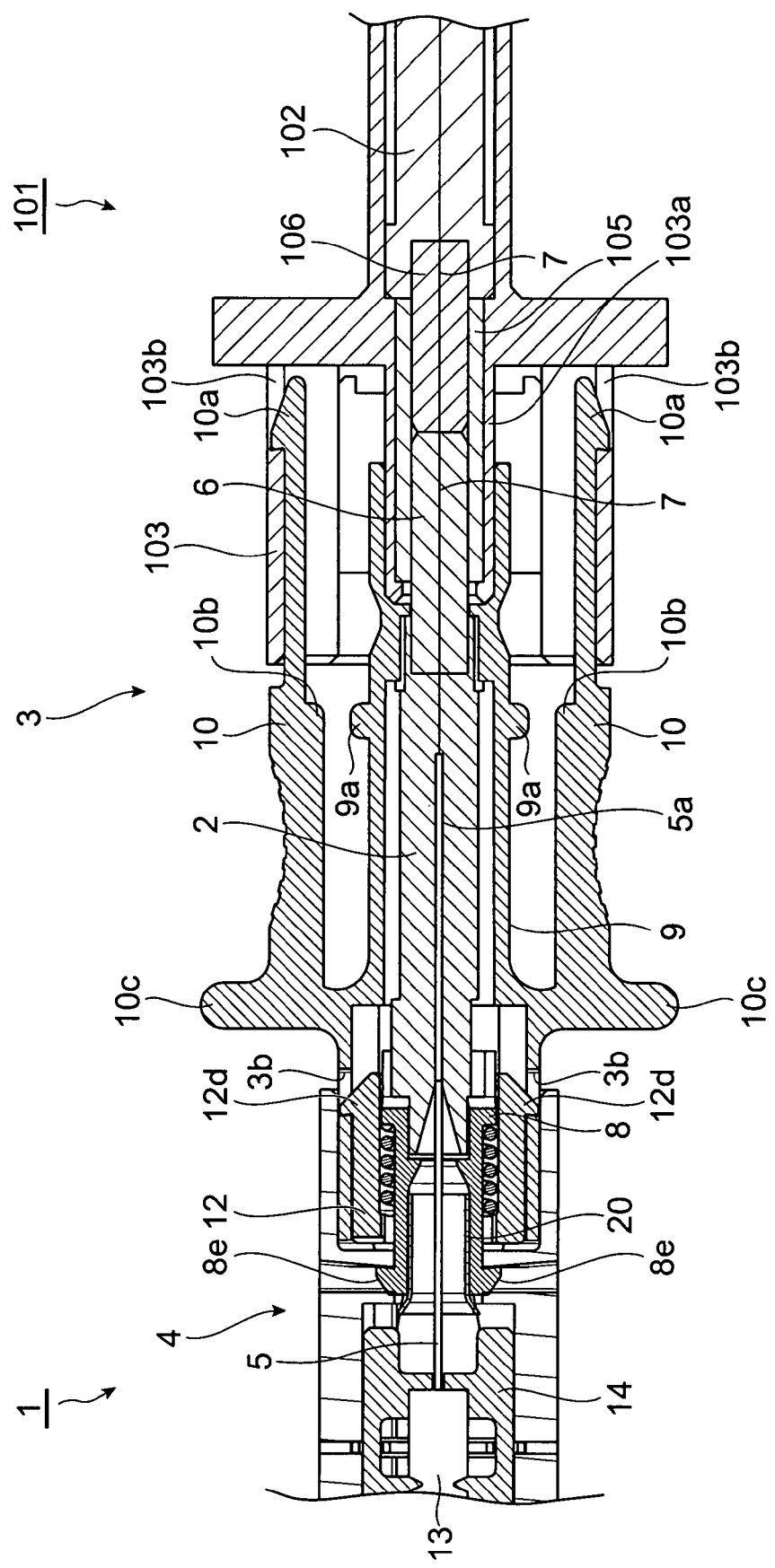
FIG. 16 is a sectional view showing a state in which the male optical connector of FIG. 1 is connected to the female optical connector of FIG. 10.

Next, a method of connecting the male optical connector 1 to the female optical connector 101 will be described. FIG. 16 is a state diagram showing a joined state of the male optical connector 1 and the female optical connector 101. First, in a state in which the rear end side of the female optical connector 101 is directed to the one side in the predetermined axial direction and in which the tip end side of the female optical connector 101 is directed to the other side, the projections 10c of the outer housing 3 of the male optical connector 1 are pushed to insert the male optical connector 1 into the adapter 103. As the male optical connector 1 is inserted, the locking claws 10a of the outer housing 3 come to be appropriately locked in the apertures 103c of the adapter 103. In this manner, as shown in FIG. 16, the tip end side of the outer housing 3 is housed in the adapter 103 to establish connection between the male optical connector 1 and the female optical connector 101. In this state, the ferrule 6 is housed in the split sleeve 105 to contact the ferrule 106 so as to optically connect the short fibers 7, 7 to each other.

In this male optical connector 1 the cable jacket 13 is inserted in the jacket fixture 4 coupled on the rear end side of the mechanical splice 2 to be fixed therein, whereby the simple configuration prevents an excessive force such as a bending force from the outside from acting on the coated fiber 5 exposed from the cable jacket 13, during a work. As a result, the coated fiber 5 is easily protected.

Since the outer housing 3 housing this mechanical splice 2 has the pair of flexible arms 10 coupled to the mechanical splice housing part 9, located on both sides of the mechanical splice housing part 9, projecting toward the connected partner side, and provided with the locking claws 10a adapted for attachment to the connected partner on the tip side, the male optical connector 1 is readily attached to the connected partner by engaging the locking claws 10a with the connected partner, e.g., the aforementioned adapter 103. This results in improving workability. The conventional technology sometimes required the storage of the coated fiber 5 on the storage tray or the like, whereas the male optical connector 1 of the present invention eliminates the need for the storage on the storage tray or the like. This results in achieving reduction of production cost and improvement in workability.

The assembling method of the male optical connector 1 permits a worker to simply and stably assemble at a job site, the optical connector in the simple configuration in which the coated fiber is prevented from being subject to an excessive force such as a bending force from the outside during a work and which is readily attached to the connected partner, and thus improves workability.

Since the mechanical splice 2 is housed in the outer housing 3 so as to be movable in the axial direction and is arranged to be biased toward the tip end side by the spring 11, when ferrule's back motion occurs on occasions including the optical connection to the female optical connector 101, the cable jacket 13 fixed to the jacket fixture 4 moves backward with the ferrule's back motion, together with the jacket fixture 4 coupled to the mechanical splice 2 with this ferrule 6 therein. For this reason, the coated fiber 5 exposed from the cable jacket 13 is kept from bending, so as to securely prevent breakage of the fiber upon occurrence of the ferrule's back motion and cause no loss due to bending of the coated fiber 5.

The locking claws 10a are provided on the exterior side of the arms 10 and the arms 10 are preliminarily spread slightly to the outside. Therefore, during connection with the female optical connector 101, the flexible arms 10 are bent inward once and then opened to engage the locking claws 10a with the adapter 103. For this reason, the locking claws 10a are securely engaged with the adapter 103 and a good click feeling is given upon the engagement.

As the projections 10c projecting outward on the root side of the arms 10 are pushed, the locking claws 10a are readily engaged with the adapter 103, without flexure of the arms 10 due to an external force. In the case where the ferrule 6, mechanical splice 2, and jacket fixture 4 are coupled and where the ferrule's back motion can occur as described above, it is difficult to attach the male optical connector to the female optical connector 101 while holding the jacket fixture 4, and thus the attachment to the female optical connector 101 by pushing the projections 10c is particularly effective.

Since the arms 10 have the ribs 10b to moderately enhance the rigidity of the flexible arms 10, the locking claws 10a are securely engaged with the adapter 103 and they also prevent failure in optical connection due to occurrence of creep.

Since the projections 9a are provided on the outer surfaces of the mechanical splice housing part 9 facing the arms 10, the arms 10 come into contact with the projections 9a, which prevents the arms 10 from excessively being bent inward and thus from breaking.

Since the spacer 20 is provided with the taper portion 20a having the aperture expanding toward the rear end side, the taper portion 20a serves as a guide for insertion of the optical fiber 5a to enhance workability, during insertion of the optical fiber 5a from the back of the spacer 20.

Since the jacket fixture 4 is provided with the slit 16, the coated fiber 5 can be located from top through this slit 16 into the rear-side region of the jacket fixture 4, as shown in FIG. 4, and the tip of the coated fiber 5 can be brought to the vicinity of the taper portion 20a of the spacer, whereby the male optical connector 1 can be simply and stably assembled at a job site.

Since the jacket fixture 4 is provided with the windows 17, a worker is allowed to check an insertion state of the optical fiber 5a into the taper portion 20a of the spacer and a slack of the optical fiber 5a, which improves workability.

Since the windows 17 of the jacket fixture 4 are provided on the plurality of faces, the lighting is improved to enhance visibility. Since the windows 17 of the jacket fixture 4 are provided on the upper surface and on the lower surface, when a tool (not shown) with a wedge for insertion/detachment into or from the mechanical splice 2 is used, a V-shaped projection (not shown) on the tool side for guiding the coated fiber 5 into the spacer 20 can be inserted into the jacket fixture 4, which improves workability.

Since the part of the outer housing 3 from the rear end thereof to near the roots of the arms 10 is housed in the tip-side region of the jacket fixture 4 and the jacket fixture 4 overlaps it in the axial direction, the rigidity is enhanced against an external force acting during bending and pulling the optical cable 19.

The jacket fixture 4 is provided with the cap 18 at the predetermined position before shipment of the male optical connector 1 and during a work at a job site, the clip 15, together with the cap 18, is pushed to fix the cable jacket 13 in the jacket fixture 4; therefore, it prevents loss of the clip 15 and eliminates a need for preparing the clip 15 at a job site. In addition, workability is improved.

The rear end of the spacer 20 may be formed in a groove shape of a semicircular transverse section in order to permit the optical fiber to be mounted thereon from above. Alternatively, a guide portion with guide width increasing toward top, e.g., a guide portion of a nearly V-shaped section may be additionally provided in the upper part of the above-described groove shape. This permits the optical fiber 5a to be located from above into the interior of the jacket fixture 4 and to be mounted on the spacer 20, which improves workability.

Since in the female optical connector 101 the housing 104 forming the female optical connector 101 is provided with the adapter 103, the number of connections and the number of parts are reduced when compared with a case where a relaying adapter is used. This results in achieving reduction of cost. The jacket holder 115 holding the cable jacket 13 is placed in the base part 110 of the housing 104 and the lid 111 is closed to fix the jacket holder 115 to the housing 104; therefore, the simple configuration prevents the coated fiber 5 exposed from the cable jacket 13, from being subject to an excessive force such as a bending force from the outside during a work. This results in readily protecting the coated fiber. The conventional technology sometimes required the storage of the coated fiber 5 on the storage tray or the like, whereas the female optical connector 101 of the present invention eliminates the need for the storage on the storage tray or the like. This results in achieving reduction of production cost and improvement in workability.

The foregoing assembling method of the female optical connector 101 reduces the number of connecting works and the number of parts, permits a worker to simply and stably assemble at a job site, the female optical connector 101 in the simple configuration in which the coated fiber 5 exposed from the cable jacket 13 is prevented from being subject to an excessive force such as a bending force from the outside during a work, and thus improves workability.

In the female optical connector 101 the base part 110 is provided with the mechanical-splice stopper 108 for fixing the mechanical splice 102 from the back side and this mechanical-splice stopper 108 is provided with the groove 108c for guiding the coated fiber 5 led out from the cable jacket 13; therefore, the groove 108c serves as a guide for the coated fiber 5 to facilitate placement thereof and improve workability and the coated fiber 5 is prevented from touching the surroundings, which prevents breakage of the coated fiber 5. When this groove 108c is located on the upper side during assembly of the female optical connector, it enhances visibility to further improve workability.

In the female optical connector 101, the base part 110 and the lid 111 both are arranged to extend out with the predetermined curvature and into the direction at 90° relative to the axis of the ferrule 106, and this configuration permits the cable jacket 13 to extend out in the foregoing extending direction without bending of the cable jacket 13 (optical cable 19); therefore, the lengths of the female optical connector 101 and the optical cable 19 become shorter by the bending of the coated fiber 5, instead of bending the cable jacket 13.

Since the female optical connector 101 has the configuration for temporarily fixing the jacket holder 115 at the predetermined position in the base part 110, it prevents the jacket holder 115 from deviating from the predetermined position or from dropping before closing of the lid 111, which improves workability.

When the optical connector is applied to an outlet, the larger width direction of the cable jacket 13 (the direction of juxtaposition of the tension members) is 90° different, and with the jacket holder 115, the cable jacket 13 might be bent in the larger width direction of the cable jacket 13 hard to bend. In this case, another jacket holder 114 for holding the cable jacket 13 can be used instead of the jacket holder 115.

Figure 17:
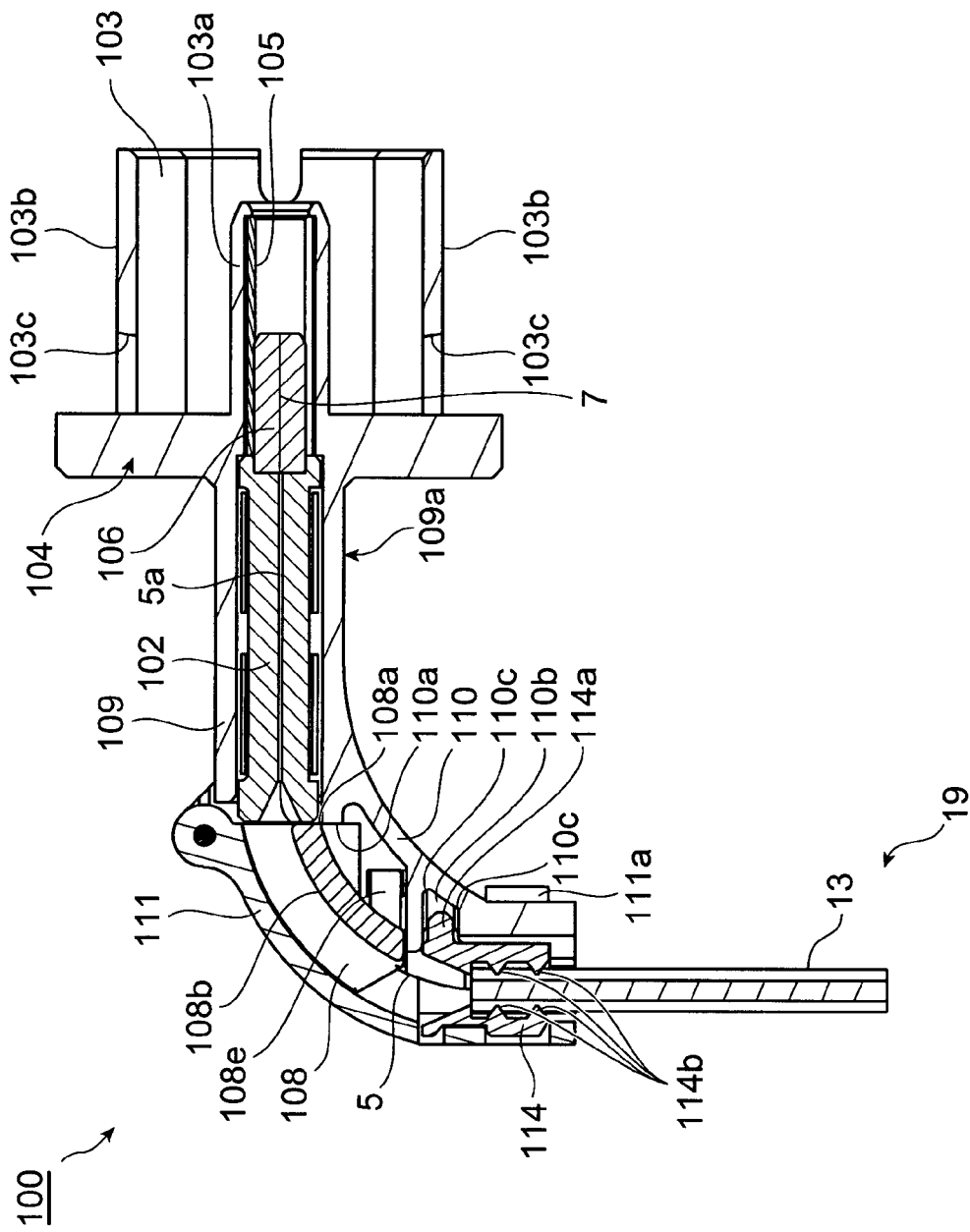
FIG. 17 is a horizontal sectional view of another female optical connector as a connected partner to the male optical connector shown in FIG. 1.
Figure 32:
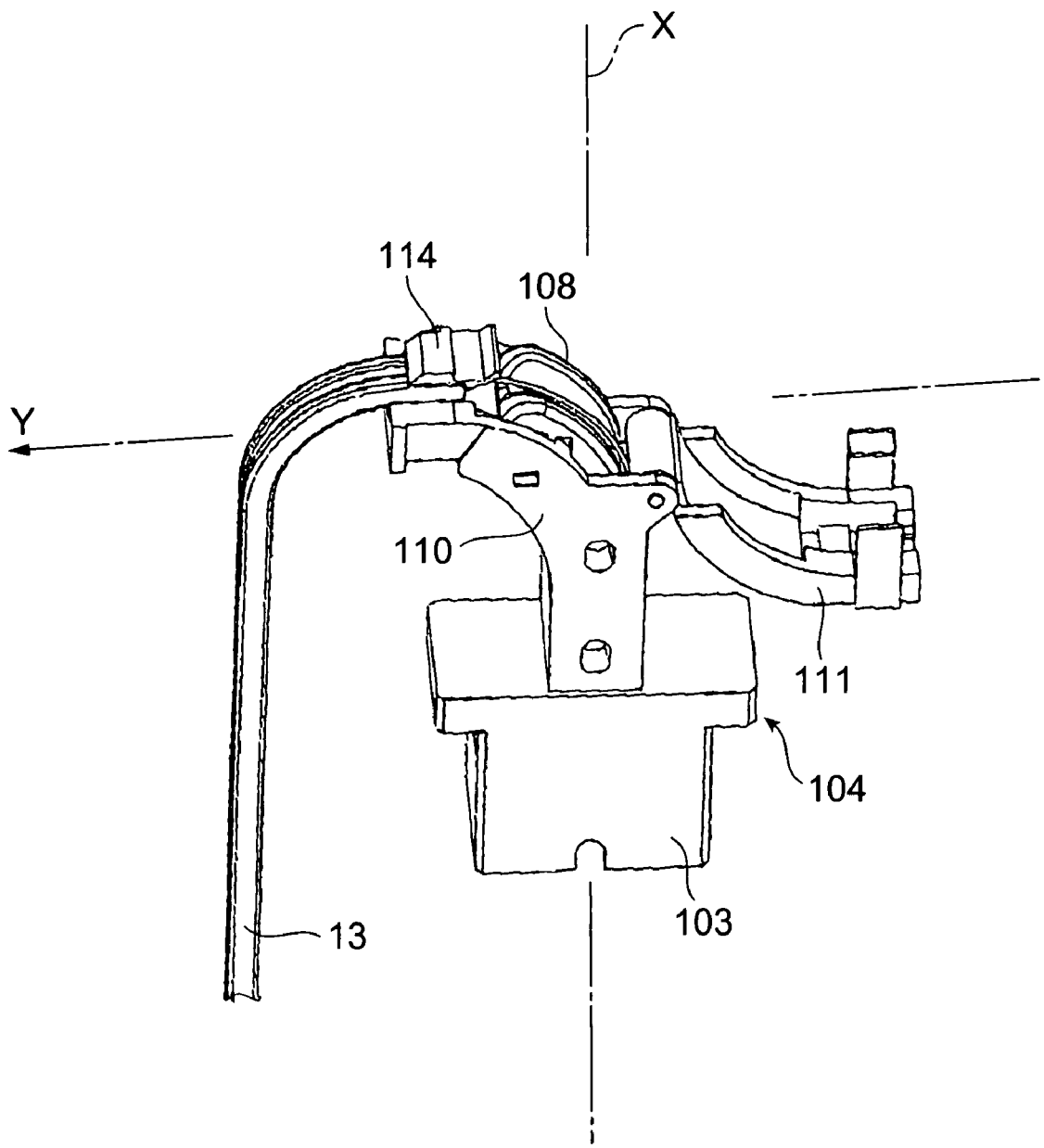
FIG. 32 is a perspective view of the female optical connector shown in FIG. 17.

This other jacket holder 114, as shown in FIG. 17, has such a shape as to hold the cable jacket 13 from the same directions as the aforementioned jacket holder 115 and as to fix the cable jacket 13 to the base part 110 in a state in which the cable jacket 13 is turned 90° about the axis relative to the jacket holder 115. Namely, as shown in FIG. 32, the jacket holder 114 is placed in the base part 110 so that the aforementioned other direction of the cable jacket 13 is approximately perpendicular to the predetermined axial direction (the X-direction of the axis shown in FIG. 32) and to the predetermined direction (the Y-direction shown in FIG. 32) inside the base part 110.

Figure 13:
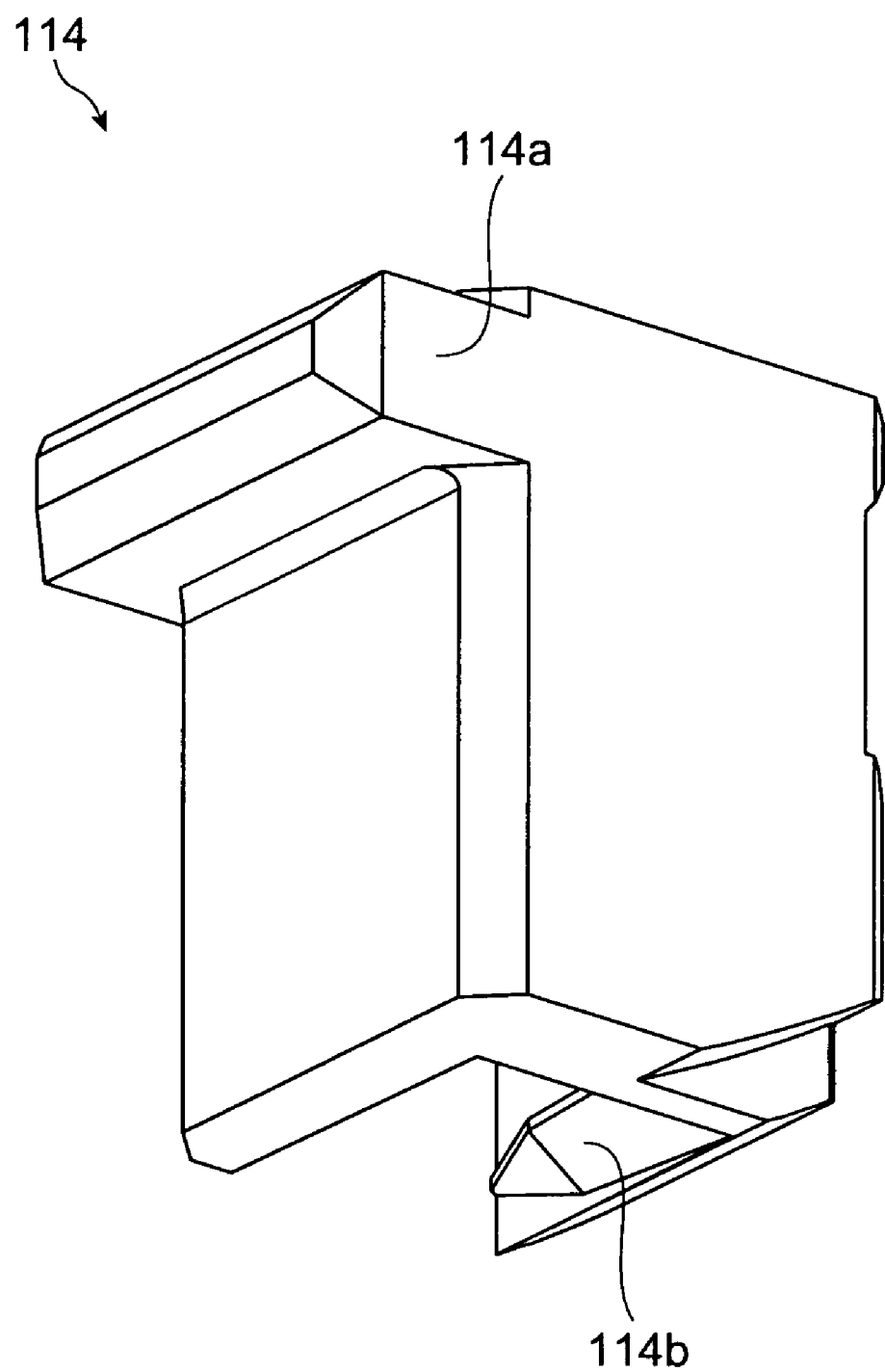
FIG. 13 is a perspective view of a jacket holder (for outlet).

Specifically, as shown in FIG. 13, the jacket holder 114 is provided with claws 114b for pinching the cable jacket 13 from the smaller width directions (the upper and lower surfaces in FIG. 18), and the jacket holder 114 is arranged to hold the cable jacket 13 and to insert a projection 114a in the recess 110b of the female optical connector 100 shown in FIG. 11, as shown in FIG. 17. This other jacket holder 114 achieves an easy turn by 90° of the larger width direction of the cable jacket 13 and permits easy bending thereof, whereby the optical connector can be readily applied to a cabinet or an outlet.

In the female optical connector 100 shown in FIG. 17, the base part 110 is provided with the recess 110b for attachment of the jacket holder 114.

In the above-described female optical connectors 100, 101, the base part 110 and the lid 111 thereof are arranged to lead the cable jacket 13 out with the predetermined curvature and into the direction at 90° relative to the axial direction of the ferrule 106, but they may be arranged to lead the cable jacket 13 out into another direction relative to the axial direction of the ferrule 106 (e.g., into an oblique direction except for 0°).

[Second Embodiment]

Figure 19:
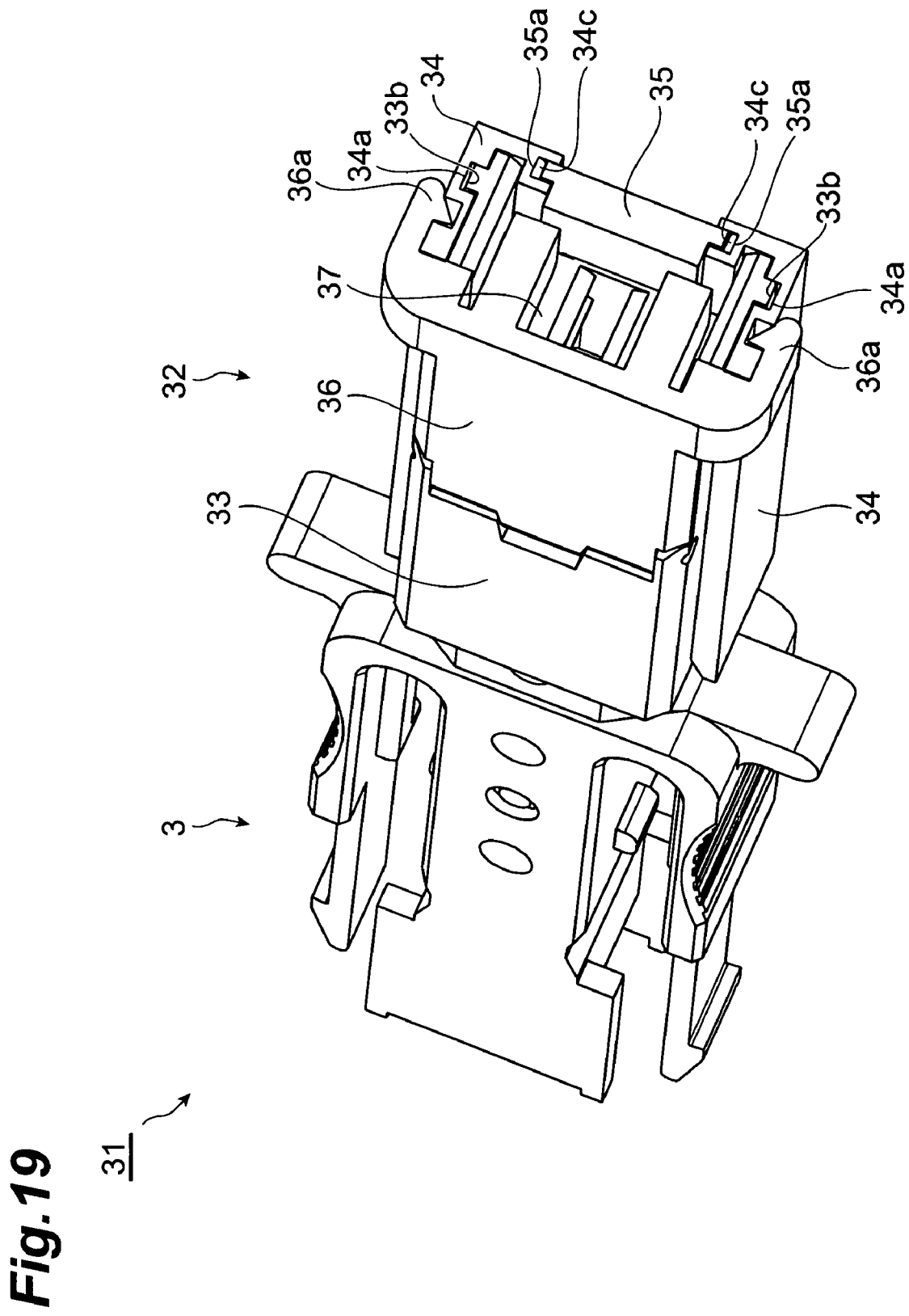
FIG. 19 is a perspective view of a male optical connector (before attachment of an optical cable) in a closed lid state according to a second embodiment of the present invention.

Next, a male optical connector according to the second embodiment of the present invention will be described with reference to FIGS. 19 to 23. FIG. 19 is a perspective view of the male optical connector in a closed lid state (before attachment of an optical cable), and FIGS. 20 to 23 are views showing the male optical connector of FIG. 19 in an open lid state. This male optical connector 31 of the second embodiment is different from the male optical connector 1 of the first embodiment in that the jacket fixture 4 shown in FIG. 1 is replaced by a jacket fixture 32 shown in FIGS. 19-23 and in that the jacket holder 14 shown in FIG. 5 is replaced with a jacket holder 37 shown in FIG. 21, without the clip 15 shown in FIG. 5.

Specifically, as shown in FIGS. 19-23, the jacket fixture 32 is provided with a jacket fixture body 33 coupled to the mechanical splice through a coupling member having much the same function as in the first embodiment, a first movable portion 35 and a second movable portion 34 slidable in the axial direction relative to the jacket fixture body 33, and a lid 36 that can be opened and closed, and the jacket fixture 32 internally houses the jacket holder 37 shown in FIGS. 20-23.

The jacket fixture body 33 is arranged to cover the rear end side of the outer housing 3, as shown in FIGS. 19-22, and has a V-groove 33a (cf. FIG. 20) for mounting an optical fiber thereon. On side faces of the jacket fixture body 33, as shown in FIGS. 19 and 23, a pair of projections projecting outward extend in the axial direction and the projections serve as guides 33b for guiding the second movable portion 34.

Figure 23:
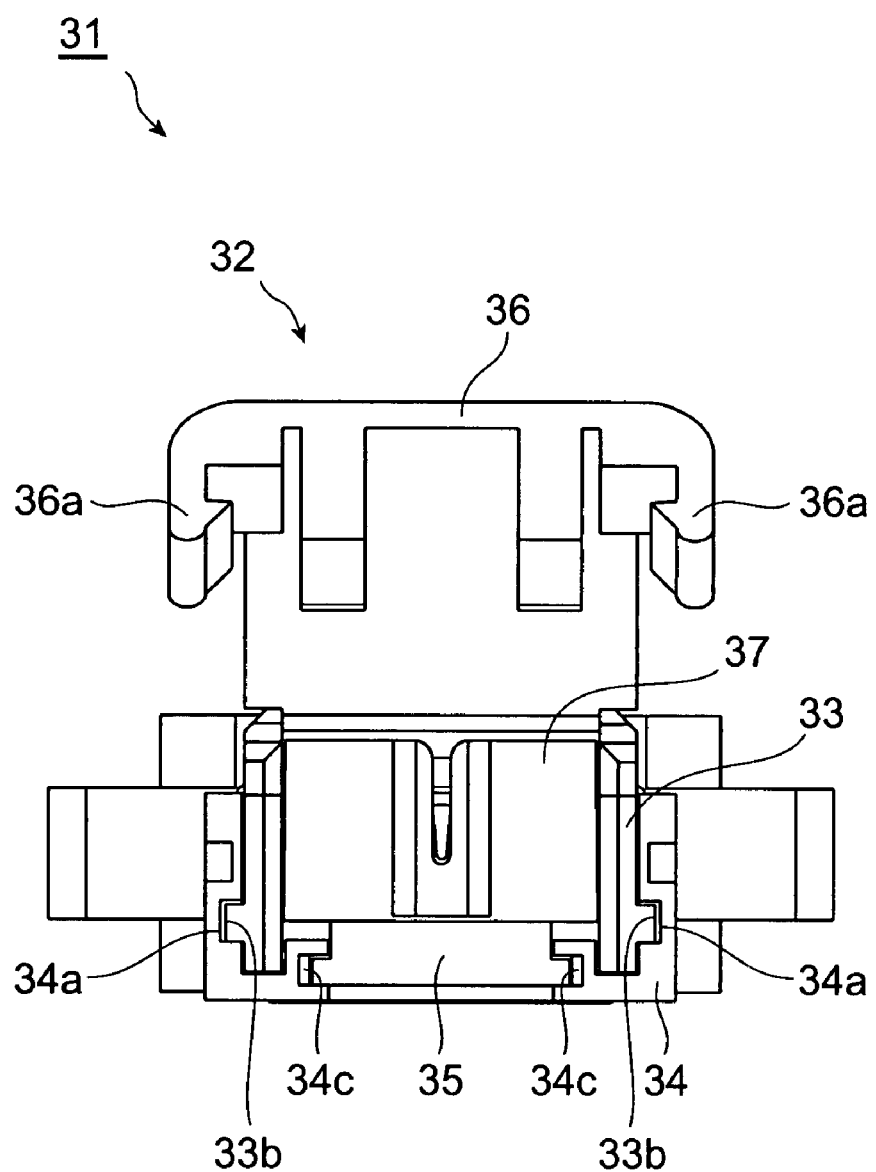
FIG. 23 is a rear view of the male optical connector shown in FIG. 19, in an open lid state.

The second movable portion 34, as shown in FIGS. 19-23, is shaped to cover the bottom face and two side faces of the jacket fixture body 33. On the side faces of the second movable portion 34, as shown in FIGS. 19 and 23, guides 34a of recesses supported by the guides 33b of the jacket fixture body 33 are provided at positions corresponding to the guides 33b of the jacket fixture body 33. With the guides 34a of the second movable portion 34 and the guides 33b of the jacket fixture body 33, the second movable portion 34 is arranged to be slidable in the axial direction of the jacket fixture body 33.

Figure 21:
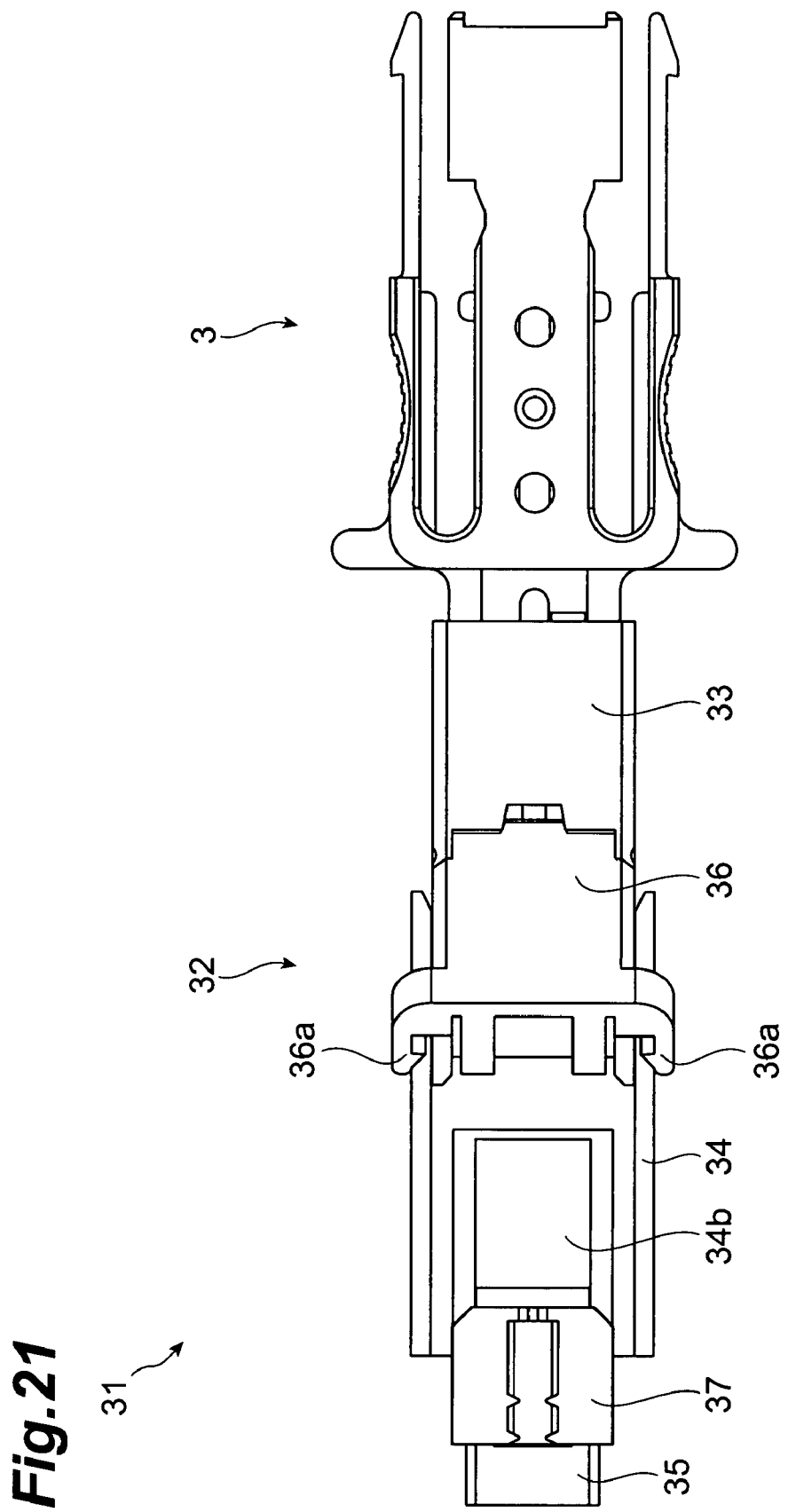
FIG. 21 is a top plan view of the male optical connector shown in FIG. 19, in an open lid state.
Figure 22:
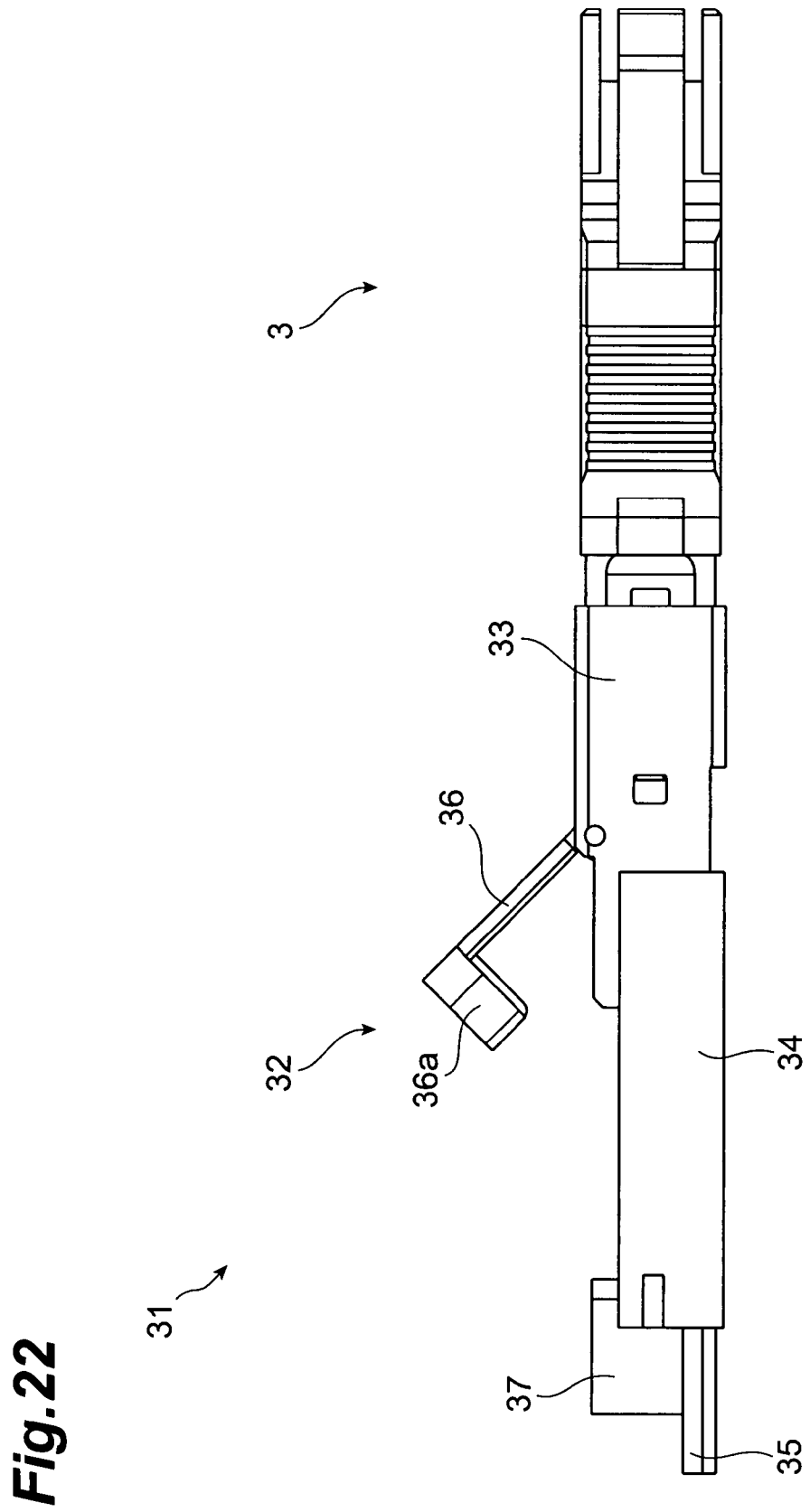
FIG. 22 is a side view of the male optical connector shown in FIG. 19, in an open lid state.

In the bottom part of the second movable portion 34, as shown in FIG. 21, an opening 34b is open from the rear end side and recesses extend, as shown in FIGS. 19 and 23, in the peripheral region in the direction perpendicular to axial direction forming the aperture 34b. The recesses serve as guides 34c for guiding the first movable portion 35.

The first movable portion 35, as shown in FIGS. 19-23, is of a plate shape and the jacket holder 37 is mounted thereon. The end faces of the first movable portion 35 in the direction perpendicular to axial direction, as shown in FIGS. 19 and 23, are provided with respective guides 35a of projections supported in the guides 34c of the second movable portion 34, at positions corresponding to the guides 34c of the second movable portion 34. With the guides 35a of the first movable portion 35 and the guides 34c of the second movable portion 34, the first movable portion 35 is arranged to be slidable in the axial direction of the second movable portion 34.

Figure 20:
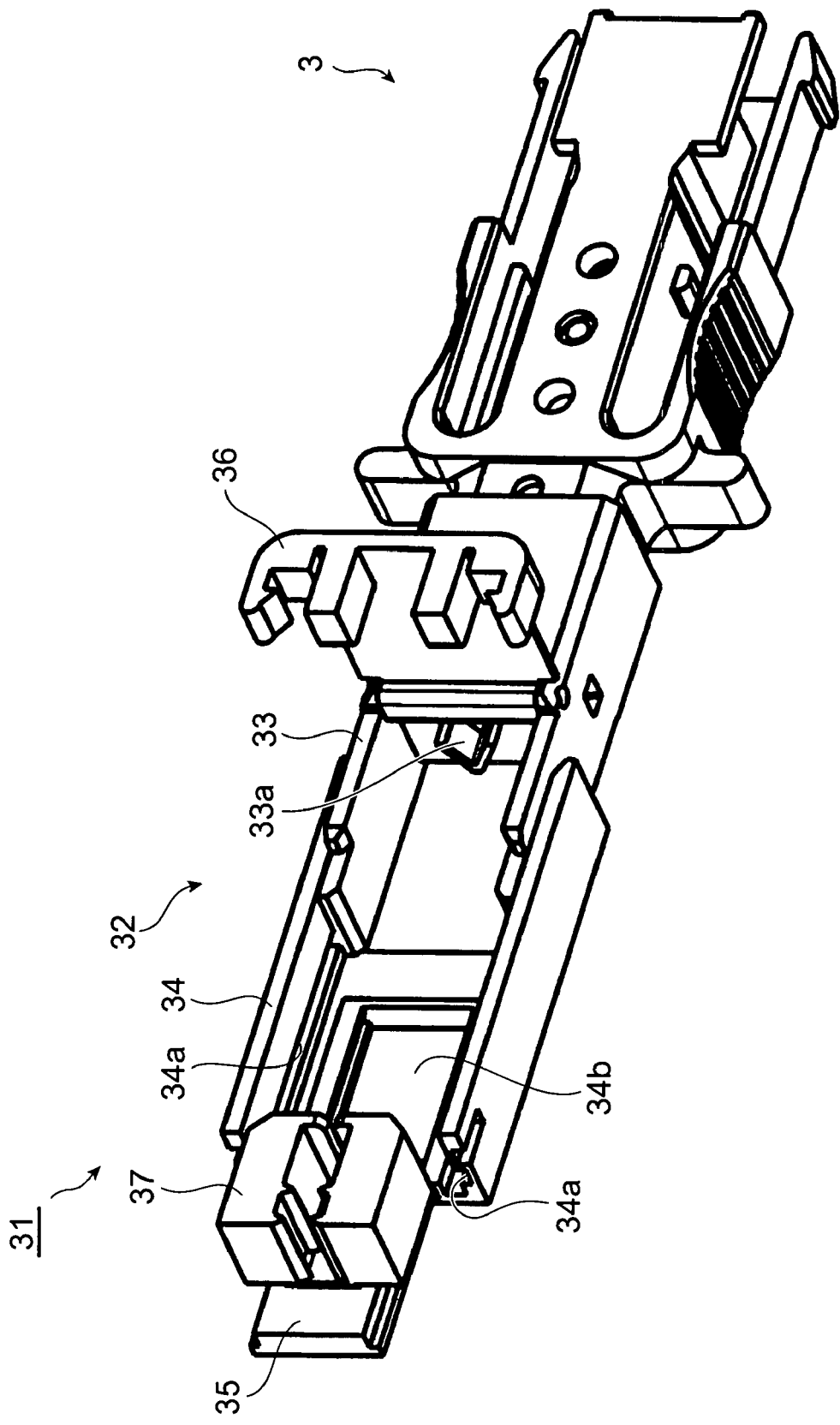
FIG. 20 is a perspective view of the male optical connector shown in FIG. 19, in an open lid state.

The jacket holder 37, as shown in FIGS. 20, 21, and 23, is provided with a recess opening top, and is arranged to hold the cable jacket inside while pinching it by projections.

The lid 36, as shown in FIGS. 19-23, is attached to the upper surface of the jacket fixture 32 by a hinge. This lid 36 is provided with a pair of locking claws 36a on the rear end side, and the locking claws 36a are engaged with the second movable portion 34, whereby the lid is closed to cover the cable jacket and the jacket holder 37 and to fix them to the jacket fixture 32.

Next, an assembling method of the male optical connector 31 in this configuration will be described briefly. First, in the same manner as in the assembling method of the male optical connector 1 of the first embodiment, the coated fiber 5 is exposed by a predetermined length from the optical cable 19, and the tip of the optical fiber 5a is cut so as to adapt for optical connection. Then the cable jacket 13 of the optical cable 19 is put into the jacket holder 37 to be held thereby, and this jacket holder 37 is mounted on the first movable portion 35. At this time, the optical fiber 5a is mounted on the V-groove 33a.

Next, the first movable portion 35 is slid to the tip side to be housed in the second movable portion 34. Then this second movable portion 34 is slid to the tip side so that the second movable portion 34 is housed into the jacket fixture body 33.

After a worker confirms by visual recognition or by hand's sense that the optical fiber 5a comes to butt the short fiber 7 or that the coated fiber 5 slacks, the mechanical splice 2 is brought into the closed state to mechanically fix the short fiber 7 and the optical fiber 5a.

Finally, the lid 36 is closed to fix the jacket holder 37 to the jacket fixture 32, obtaining the male optical connector 31 (the cable and others of which are not shown).

The male optical connector 31 as described above also achieves the same effects as the male optical connector 1 of the first embodiment, and, in addition, an improvement is made in assembly performance of the male optical connector 31. The male optical connector 31 of this configuration is effective, particularly, in the case where it is used in a rosette.

Figure 24:
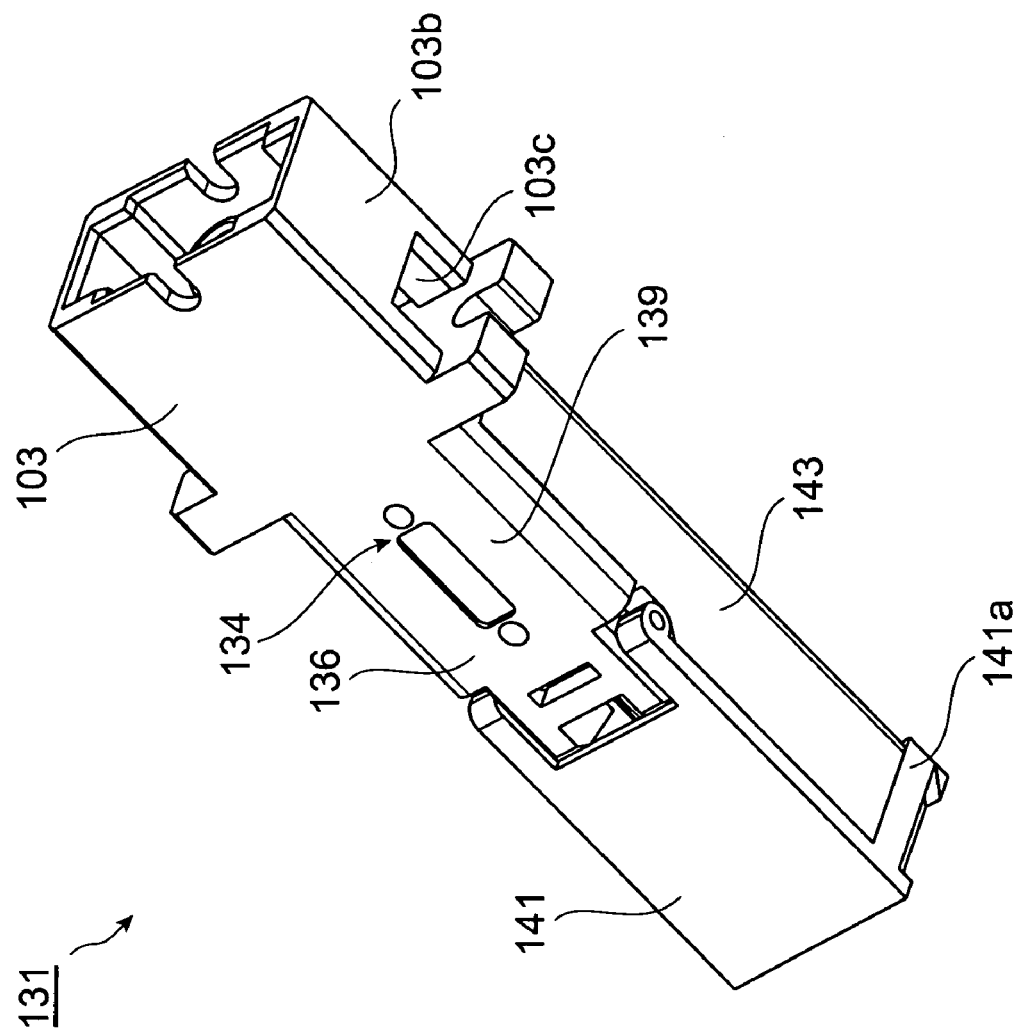
FIG. 24 is a perspective view of a female optical connector according to the second embodiment of the present invention, which is a connected partner to the male optical connector shown in FIG. 19.

Next, a female optical connector according to the second embodiment of the present invention will be described. This female optical connector is a connected partner to the male optical connector 31 assembled as described above. FIG. 24 is a perspective view of the female optical connector as a connected partner to the male optical connector shown in FIG. 19, FIGS. 25 and 26 are sectional views of the female optical connector shown in FIG. 24, and FIGS. 27 and 28 views of the female optical connector shown in FIG. 24, in an open lid state.

Figure 25:
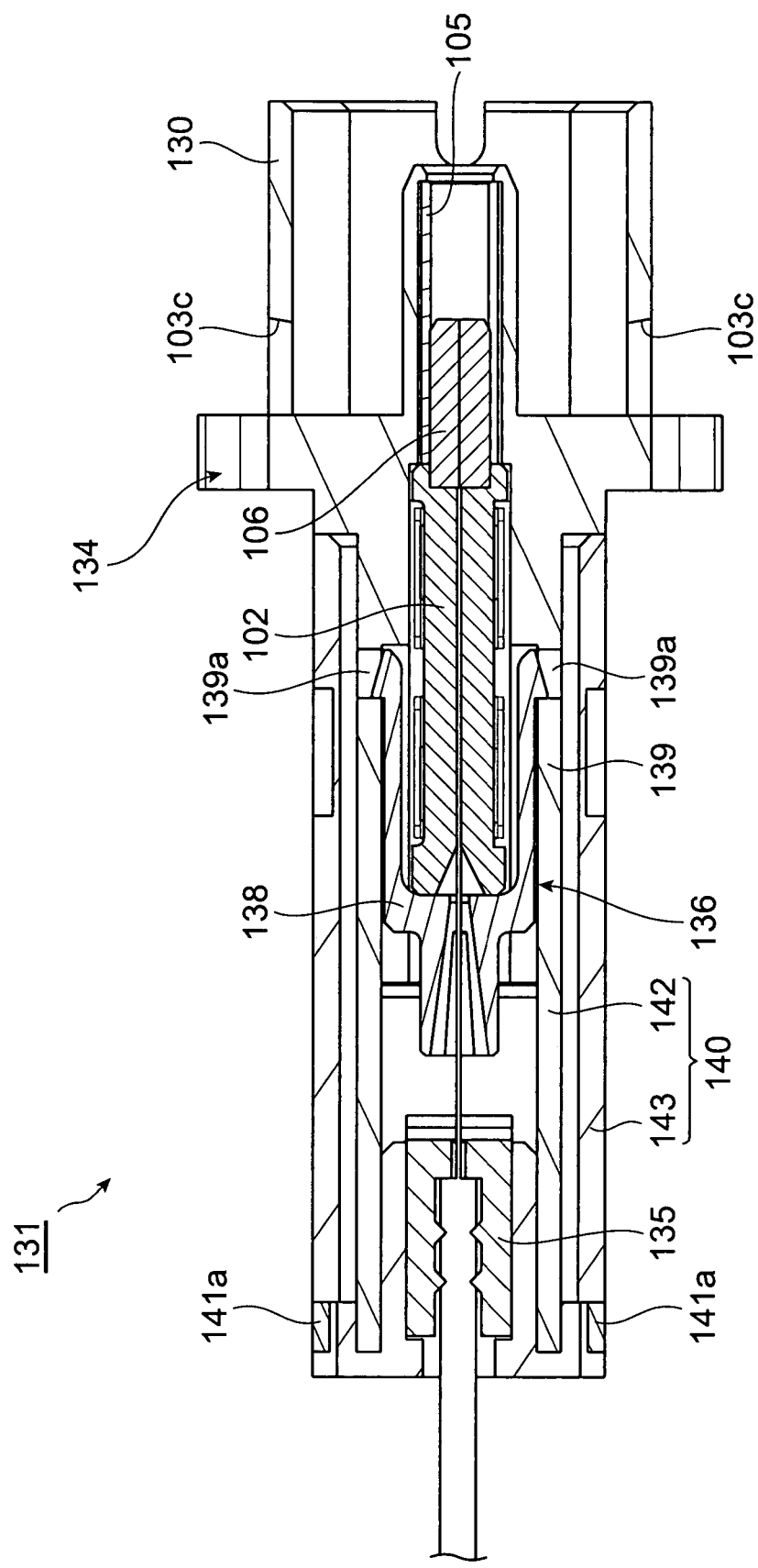
FIG. 25 is a horizontal sectional view of the female optical connector shown in FIG. 24.
Figure 26:
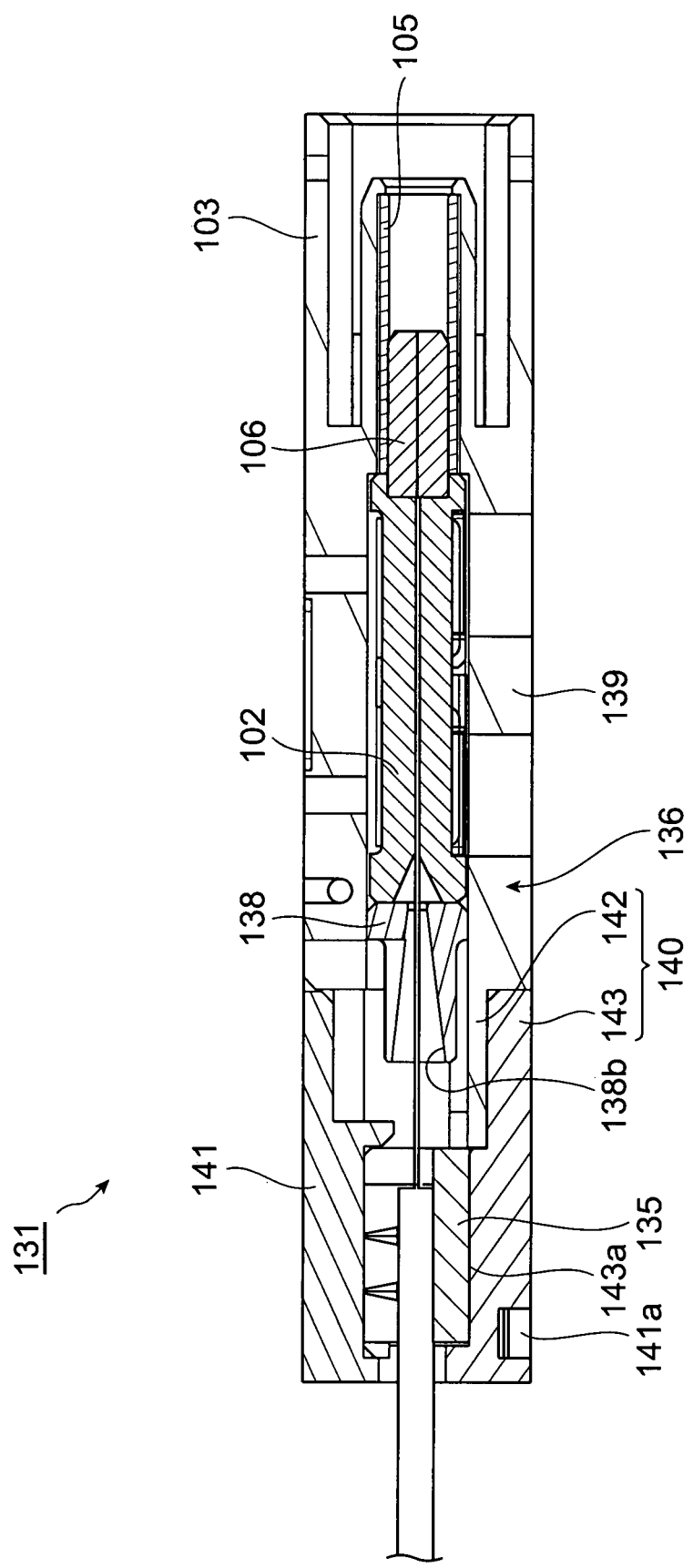
FIG. 26 is a vertical sectional view of the female optical connector shown in FIG. 24.

This female optical connector 131 is different from the female optical connector 101 shown in FIGS. 10 and 11, in that the housing 104 with the base part 110 and the lid 111 is replaced by a housing 134 with base part 140 and lid 141 shown in FIGS. 24-28 and in that the mechanical-splice stopper 108 and the jacket holder 114 shown in FIG. 11 are replaced by mechanical-splice stopper 138 and jacket holder 135 shown in FIGS. 24 and 25.

Specifically, as shown in FIGS. 24-28, the housing 134 is of an approximately rectangular cylinder shape and is provided with an adapter 103, a mechanical splice housing part 139 for housing the mechanical splice 102, and the base part 140 and lid 141 provided on the rear side of the mechanical splice housing part 139 and linearly extending backward. The base part 140 is divided into a base part body 142 coupled to the mechanical splice housing part 139, and a movable base portion 143 slidable in the axial direction relative to the base part body 142. The mechanical splice housing part 139 and the base part body 142 constitute a housing body 136.

Figure 28:
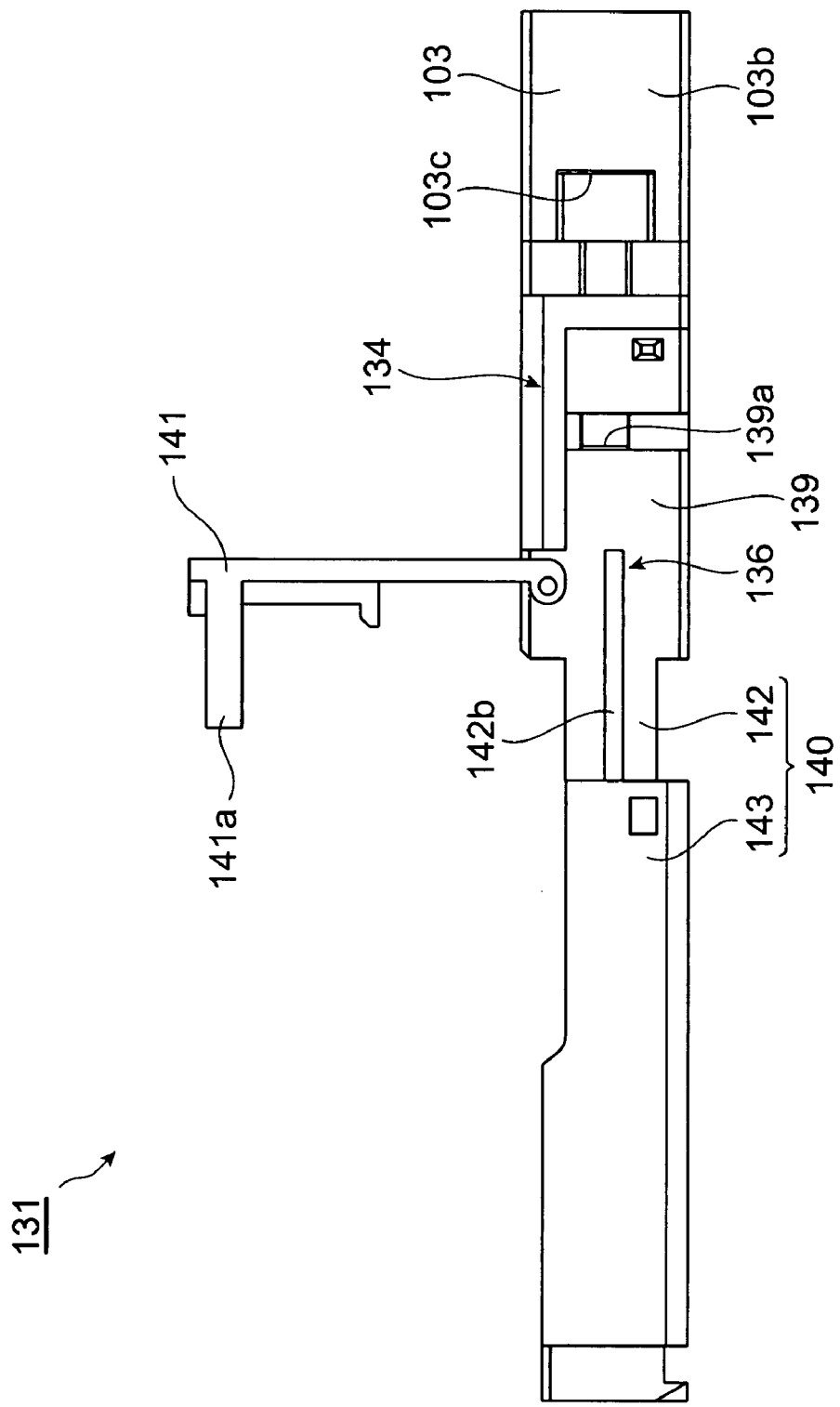
FIG. 28 is a side view of the female optical connector shown in FIG. 24, in an open lid state.

The mechanical splice housing part 139, as shown in FIGS. 25 and 28, internally houses the mechanical-splice stopper 138 and is provided with a pair of apertures 139a for locking of the mechanical-splice stopper 138, in opposed side walls.

Figure 27:
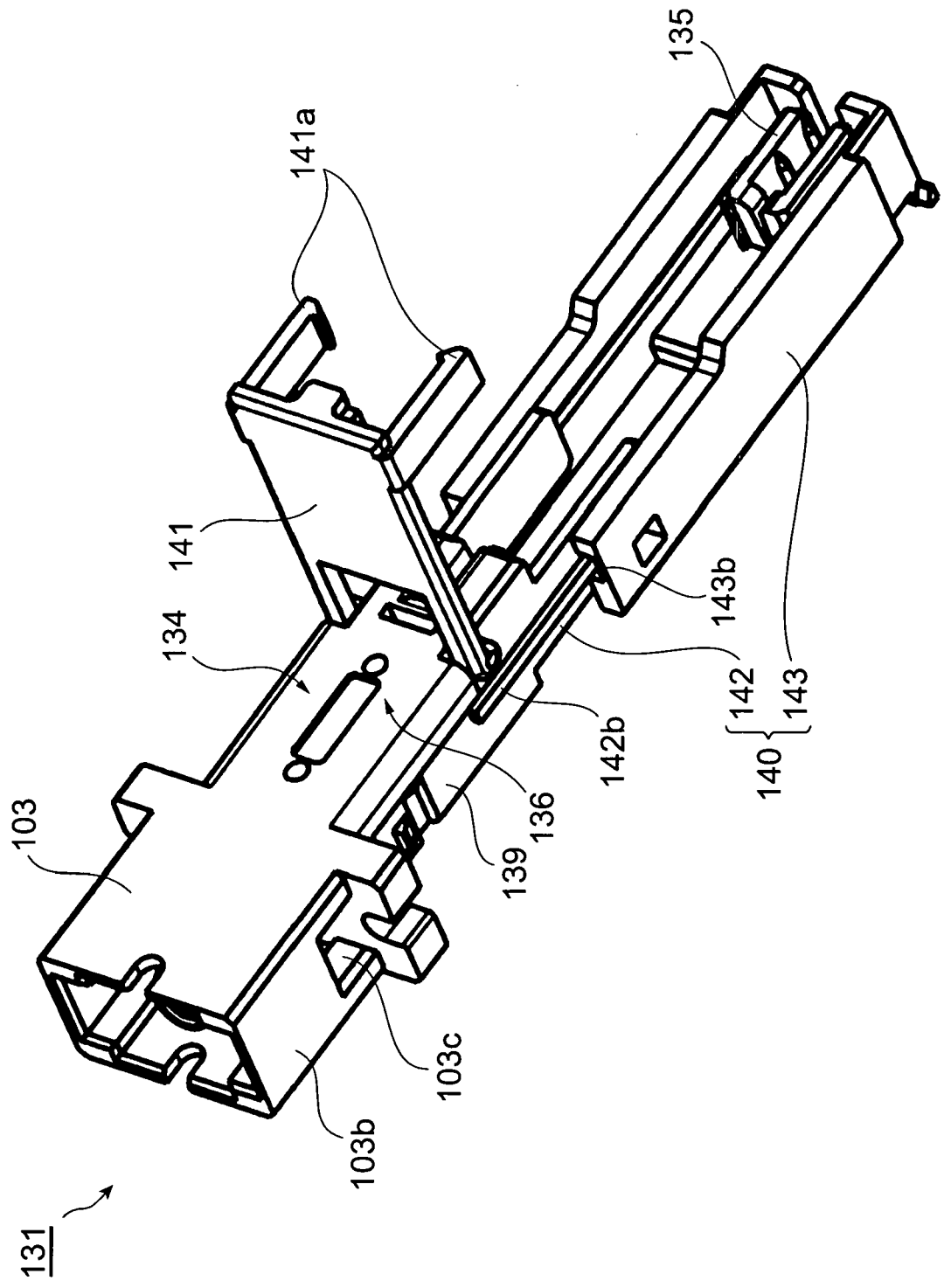
FIG. 27 is a perspective view of the female optical connector shown in FIG. 24, in an open lid state.

On the outer surfaces of the side walls of the housing body 136, as shown in FIGS. 27 and 28, a pair of projections projecting outward extend in the axial direction and these projections serve as guides 142b for guiding the movable base portion 143.

The mechanical-splice stopper 138, as shown in FIGS. 25 and 26, is of an approximately cylindrical shape and is arranged to cover the rear end side of the mechanical splice 102 and, as shown in FIG. 25, to engage its locking claws 138a with the apertures 139a of the mechanical splice housing part 139 to fix the mechanical splice 102 to the mechanical splice housing part 139 from the rear end side. In order to facilitate insertion of the optical fiber in the mechanical splice 102 from the rear end side of the mechanical-splice stopper 138, the mechanical-splice stopper 138 is provided with a taper portion 138b which has an aperture expanding toward the rear end side and in which a slit for establishing communication between interior and exterior is formed in the rear upper part so as to facilitate mounting from above.

The movable base portion 143, as shown in FIGS. 24-28, has its side walls placed outside the side walls of the housing body 136, and, as shown in FIG. 26, a jacket holder 135 is mounted on a bottom plate 143a. As shown in FIG. 27, guides 143b of recesses are formed in the opposed side walls of the movable base portion 143, and these guides 143b are supported by the guides 142b of the housing body 136. With the guides 143b of the movable base portion 143 and the guides 142b of the housing body 136, the movable base portion 143 is arranged to be slidable in the axial direction of the base body 142.

The jacket holder 135, as shown in FIGS. 25-27, is arranged to pinch and hold the cable jacket so that the larger width direction of the cable jacket agrees with the horizontal direction. It is also possible to adopt a jacket holder for pinching and holding the cable jacket so that the larger width direction thereof agrees with the vertical direction.

The lid 141, as shown in FIGS. 24-28, is attached to the upper surface of the base part body 142 by a hinge. This lid 141 is provided with a pair of locking claws 141a on the rear end side, and is arranged to engage the locking claws 141a with the base part body 142 to be closed, thereby to cover the cable jacket and the jacket holder 135 and to fix them to the base part body 142.

Next, an assembling method of the female optical connector 131 in this configuration will be described briefly. First, in the same manner as in the assembling method of the male optical connector 1 of the first embodiment, the coated fiber 5 is exposed by a predetermined length from the optical cable 19. Then the cable jacket 13 of the optical cable 19 is pinched and held on the jacket holder 135 and the tip of the optical fiber 5a is cut so as to adapt for optical connection. Then this jacket holder 135 is mounted on the movable base portion 143. At this time, the optical fiber is mounted through the slit into the groove of the taper portion 138b of the mechanical-splice stopper.

Next, the movable base portion 143 is slid to the tip side to be housed in the base part body 142. After a worker confirms by visual recognition or by hand's sense that the optical fiber 5a comes to butt the short fiber 7 or that the coated fiber 5 slacks, the mechanical splice 2 is brought into the closed state to mechanically fix the short fiber 7 and the optical fiber 5a.

Finally, the lid 141 is closed to fix the jacket holder 135 to the base part 140, obtaining the female optical connector 131 (the optical cable and others of which are not shown).

The female optical connector 131 of this configuration also achieves the same effects as the female optical connector 101 of the first embodiment and, in addition, an improvement is made in assembly performance of the female optical connector 131 and it can be adopted as a linear female optical connector. The female optical connector 131 of this configuration is effective, particularly, in the case where it is used in a rosette.

The female optical connector 131 may be arranged to have a configuration (the optical cable and others of which are not shown) for temporarily fixing the jacket holder 135 to the movable base portion 143.

In the assembling method of the female optical connector 131, the lid 141 is preferably closed after removal of a slack in the coated fiber 5.

Figure 29:
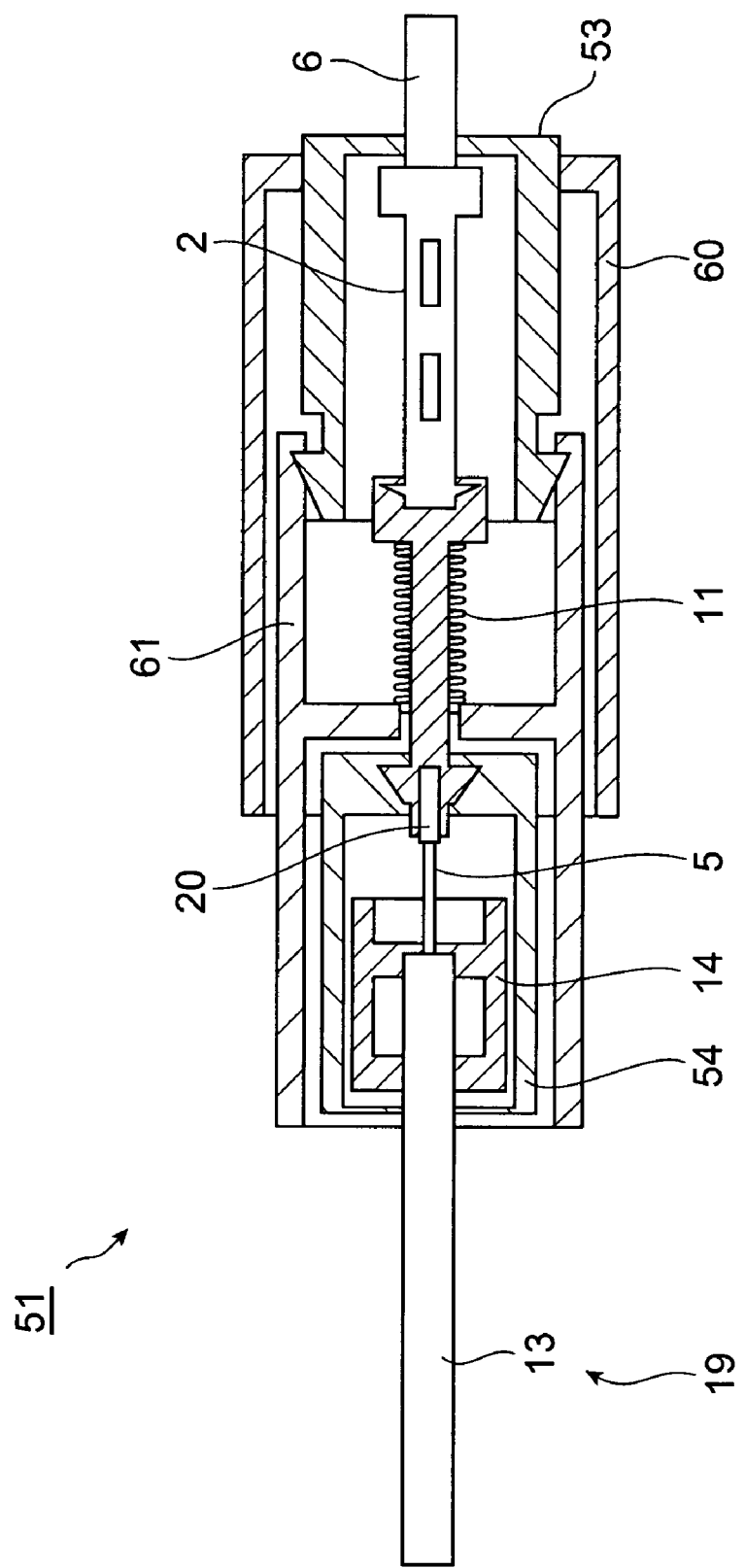
FIG. 29 is a horizontal sectional view of a male optical connector according to a modification example of the present invention.

Next, a male optical connector as a modification example of the present invention will be described with reference to FIG. 29. This male optical connector 51 is a male optical connector of the SC structure. This male optical connector 51 is different from the male optical connector 1 shown in FIG. 1, in that the optical connector is not provided with the locking claws 10a (arms 10) to be engaged with the connected partner, as shown in FIG. 29, in that an outer housing 53 is covered by a second outer housing 60 coupled to the outer housing 53, and in that a jacket fixture 54 is covered by a spring push 61 externally located on and coupled with the outer housing 53 and extending backward. Reference numeral 58 denotes a coupling member for coupling the mechanical splice 2 to the jacket fixture 54.

Figure 30:
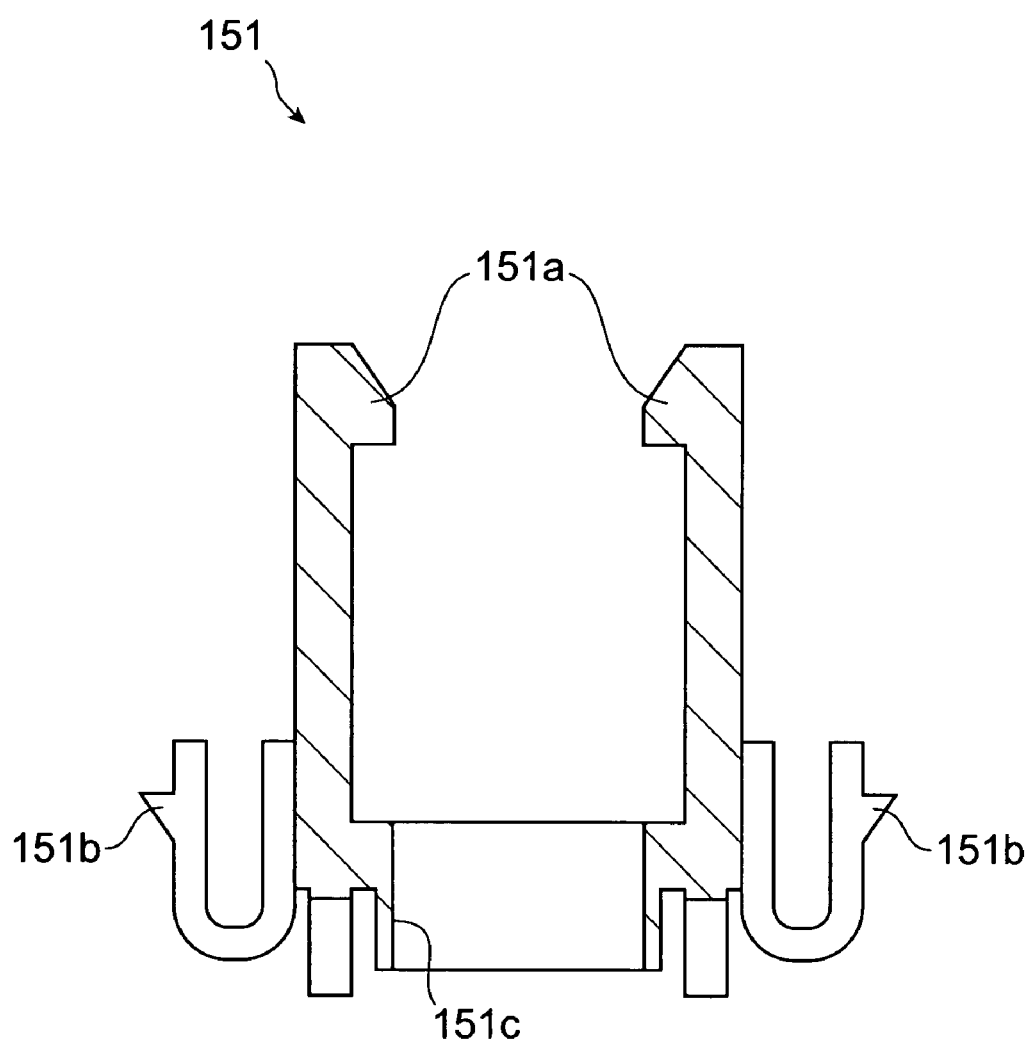
FIG. 30 is a sectional view of an attachment housed in an adapter shown in FIG. 11.

FIG. 30 is a sectional view of an attachment housed in the adapter 103 shown in FIG. 11. This attachment 151 is housed in the adapter 103 of the female optical connector 101 shown in FIG. 11, and is used in connection of the male optical connector 51 of the SC structure.

As shown in FIG. 30, the attachment 151 is provided with a pair of locking claws 151a extending to the tip side and adapted for attachment of the male optical connector 51 as a connected partner, and the locking claws 151a are arranged not to project from the tip end face of the adapter 103 when the attachment 151 is housed in the adapter 103 shown in FIG. 11. On the rear end side of the attachment 151, as shown in FIG. 30, there are a pair of projections 151b shown in FIG. 30, which project outward and which are put into the apertures 103c of the adapter 103 shown FIG. 11. An aperture 151c for insertion of the cylindrical part 103a of the female optical connector 101 shown in FIG. 11 is formed in the axial direction in the attachment 151.

Next, connection between the male optical connector 51 shown in FIG. 29 and the female optical connector 101 shown in FIG. 11 will be described. First, the attachment 151 shown in FIG. 30 is inserted into the adapter 103 shown in FIG. 11, to lock the projections 151b shown in FIG. 30, in the apertures 103c shown in FIG. 11. At this time, the cylindrical portion 103a shown in FIG. 11 is inserted in the aperture 151c shown in FIG. 30, and the locking claws 151a shown in FIG. 30 are kept from projecting out from the tip end face of the adapter 103 shown in FIG. 11.

In this state, the male optical connector 51 shown in FIG. 29 is inserted into the adapter 103 shown in FIG. 11, while the second outer housing 60 or the spring push 61 thereof is held; the locking claws 151a shown in FIG. 30 are attached to the second outer housing 60 shown in FIG. 29 and the ferrules are brought into contact with each other, thereby completing the connection between the male optical connector 51 and the female optical connector 101.

As described above, in the case where the male optical connector 51 is adopted, the connection can also be established while holding the second outer housing 60 or the spring push 61 (because the jacket fixture 54 cannot be held inside the spring push 61); therefore, even in the configuration where the ferrule's back motion occurs, the female optical connector 101 can also be attached readily.

Since the adapter 103 of the female optical connector 101 carries the attachment 151 as housing it, the female optical connector 101 can be connected to the male optical connector 51 of the SC structure, so as to enhance general versatility; in addition, since the locking claws 151a are arranged not to project out from the tip end face of the adapter 103, the male optical connector 51 can be readily attached using the adapter 103 as a guide for the male optical connector 51, instead of using the locking claws 151a as a guide for the male optical connector 51.

In the male optical connector 51 of the modification example, as shown in FIG. 29, the spring push 61 is arranged to cover the jacket fixture 54, but the connector may also be arranged so that the second outer housing 60 covers the jacket fixture 54.

The attachment 151 is not applied only to the female optical connector 101, but it can also be applied to the female optical connector 100 shown in FIG. 17 and to the female optical connector 131 shown in FIG. 24.

The connected partner to the female optical connectors 100, 101, 131 having this attachment 151 is not limited only to the male optical connector 51 of the above shape, but may also be any male optical connector of the SC structure commercially available, of course.

The present invention was specifically described above on the basis of the embodiments thereof, but it is noted that the present invention is by no means limited to the above embodiments. For example, the above embodiments showed the connection between the male optical connector 1 and the female optical connector 101 and the connection between the male optical connector 31 and the female optical connector 100, 131, but it is also possible to connect the male optical connector 1 to the female optical connector 100, 131 or to connect the male optical connector 31 to the female optical connector 101, without any restrictions on combination thereof.

The male optical connectors 1, 31 with the arms 10 in the above embodiments may be arranged so that the jacket fixture 4, 32 is completely covered by the outer housing or by the member coupled to the outer housing (e.g., the spring push) in the same manner as in FIG. 29, and this configuration enables easy attachment even in the case where the ferrule's back motion can occur, as in the case of FIG. 29.

The optical connectors 1, 31, 51, 100, 101, and 131 in the above embodiments were described as single-fiber optical connectors, but they may also be adopted as multi-fiber optical connectors.

Industrial Applicability

In the optical connectors according to the present invention, the simple configuration prevents the coated fiber from being subject to an excessive force such as a bending force from the outside during a work, and thus readily protects the coated fiber and, the optical connectors are readily attached to a connected partner, so as to enhance workability. The assembling methods of the optical connectors according to the present invention permit a worker to simply and stably assemble the optical connectors at a job site, so as to enhance workability.

The invention claimed is:

1. An optical connector to be connected to an optical fiber in an optical cable of a tight structure in which a coated fiber obtained by coating the optical fiber is attached tightly to a cable jacket covering the coated fiber, the optical connector comprising:
- a ferrule incorporating a short fiber extending in a predetermined axial direction;
- a mechanical splice having a holding part and a fixing part in order from a one side to an other side in the predetermined axial direction, and adapted so that the fixing part mechanically fixes the short fiber extending from the ferrule held by the holding part, toward the other side, and the optical fiber in the optical cable introduced from the other side to butt the short fiber;
- an outer housing having a cylindrical shape extending in the predetermined axial direction, and having a housing part in which the mechanical splice is located;
- a jacket fixture for fixing the cable jacket, said jacket fixture being located on the other side with respect to the mechanical splice so that the cable jacket is inserted therein, and said jacket fixture being coupled to the mechanical splice; and
- a jacket holder for attachment of the optical cable, said jacket holder is housed and fixed by the jacket fixture, and said jacket holder includes in its inside a projection, which pinches and holds the cable jacket, wherein the mechanical splice is arranged to be movable in the predetermined axial direction inside the housing part, and the jacket fixture is coupled to the mechanical splice so that the jacket fixture can move integrally with the mechanical splice in the predetermined axial direction.

2. An optical connector according to claim 1, further comprising a spring for biasing the mechanical splice toward said one side.

3. An optical connector according to claim 2, further comprising:

a coupling member for coupling the mechanical splice to the jacket fixture, said coupling member having a first contact surface extending along a plane intersecting with the predetermined axis and facing the other side; and a spring push fixed to the outer housing and having a second contact surface facing the first contact surface, wherein said spring is located between the first contact surface and the second contact surface.

4. An optical connector according to claim 1, further comprising:

a pair of flexible arms located on both sides of the housing part, said pair of arms each extending from a base end supported on the housing part, toward said one side and provided with a locking claw at a tip opposite to the base end, wherein each said arm has a rib.

5. An optical connector according to claim 4, wherein the housing part has a projection on an outer surface thereof facing each arm.

6. An optical connector according to claim 4, wherein each said arm has a projecting portion projecting outward, at the base end.

7. An optical connector according to claim 1, wherein the jacket fixture overlaps the outer housing from an end on the other side to near the arms, in the predetermined axial direction.

8. An optical connector according to claim 1, further comprising:

a jacket holder for holding the cable jacket; and a clip for fixing the jacket holder to the jacket fixture.

9. An optical connector according to claim 1, wherein the jacket fixture is completely covered by the outer housing or by a member coupled to the outer housing.

10. An optical connector according to claim 1, wherein the jacket fixture has a jacket fixture body coupled to the mechanical splice, and a first movable portion and a second movable portion each of which comprises a guide portion slidable in the predetermined axial direction relative to the jacket fixture body, wherein the first movable portion is arranged to slide to the one side with the jacket holder being mounted thereon, to be housed into the second movable portion, wherein the second movable portion is arranged to slide to the one side so that the jacket holder is located at a predetermined position in the jacket fixture body where the optical fiber led out from the cable jacket butts the short fiber, and wherein the jacket fixture body has a lid for fixing the jacket holder to the jacket fixture body when closed, in a state in which the jacket holder is located at the predetermined position.

11. An optical connector according to claim 1, wherein the outer housing is comprised of any one of polyetherimide, PPS, PBT, polycarbonate, and PES.

12. An optical connector according to claim 1, further comprising:

an other ferrule incorporating an other short fiber extending in the predetermined axial direction;

an other mechanical splice having a fixing portion and a holding portion in order from the one side to the other side in the predetermined axial direction, and adapted so that the fixing part mechanically fixes said other short fiber extending from said other ferrule held by the holding part, toward the one side, and an optical fiber in an other optical cable introduced from the one side to butt said other short fiber;

a housing comprising a housing part having a cylindrical shape extending in the predetermined axial direction and internally housing said other mechanical splice, an adapter continuing to an end on the other side of the housing part and adapted for optically coupling the other ferrule to the ferrule, a base part continuing to an end on the one side of the housing part, and a lid for opening and closing the base part; and a holder placed at a predetermined position in the base part while holding a cable jacket of the other optical cable, and fixed to the base part when the lid is closed, wherein the base part is provided with a mechanical-splice stopper having a contact surface to contact an end on the one side of the other mechanical splice, and wherein the mechanical-splice stopper is provided with a groove for guiding the optical fiber led out from the cable jacket of the other optical cable, to the fixing part.

13. An assembling method of assembling the optical connector as defined in claim 1, comprising:

removing a tension member of the optical cable to expose the coated fiber;

putting the cable jacket into the jacket holder to be held thereby;

removing a predetermined length of a coating of the coated fiber to expose the optical fiber, and cutting a tip thereof;

guiding the optical fiber into an interior of the jacket fixture through a slit provided as located above the jacket fixture and opened from a rear side to establish communication between inside and outside, and mounting the optical fiber on a fiber penetrating portion to the mechanical splice exposed through a window provided as located above the jacket fixture;

moving the jacket holder toward the mechanical splice in an open state, to house the jacket holder in the jacket fixture, and, after confirming butting of the optical fiber, bringing the mechanical splice into a closed state to mechanically fix a butting portion; and unslackening the coated fiber and thereafter fixing the jacket holder to the jacket fixture.

* * * * *